(12) United States Patent
Tokuda et al.

(10) Patent No.: US 11,338,550 B2
(45) Date of Patent: May 24, 2022

(54) HOT-STAMPED BODY

(71) Applicant: NIPPON STEEL CORPORATION, Tokyo (JP)

(72) Inventors: Kohei Tokuda, Tokyo (JP); Takuya Mitsunobu, Tokyo (JP); Akihiro Sengoku, Tokyo (JP); Kenichiro Matsumura, Tokyo (JP)

(73) Assignee: NIPPON STEEL CORPORATION, Tokyo (JP)

( * ) Notice: Subject to any disclaimer, the term of this patent is extended or adjusted under 35 U.S.C. 154(b) by 14 days.

(21) Appl. No.: 16/979,820

(22) PCT Filed: Mar. 20, 2018

(86) PCT No.: PCT/JP2018/011206
§ 371 (c)(1),
(2) Date: Sep. 10, 2020

(87) PCT Pub. No.: WO2019/180852
PCT Pub. Date: Sep. 26, 2019

(65) Prior Publication Data
US 2021/0039354 A1 Feb. 11, 2021

(51) Int. Cl.
*B32B 15/01* (2006.01)
*C22C 38/32* (2006.01)
(Continued)

(52) U.S. Cl.
CPC .......... *B32B 15/012* (2013.01); *B21D 22/022* (2013.01); *B21D 22/20* (2013.01);
(Continued)

(58) Field of Classification Search
CPC ..... B32B 15/012; B32B 15/01; B32B 15/013; B32B 15/18; B32B 15/20; B32B 15/04; B32B 15/043; B32B 2311/12; B32B 2311/20; B32B 2311/22; B32B 2311/24; B32B 2311/30; B21D 22/022; B21D 22/20; C21D 1/673; C21D 1/76; C21D 1/18; C21D 1/34; C21D 1/40; C21D 2211/008; C21D 8/005; C21D 9/0068; C22C 18/00;
(Continued)

(56) References Cited

U.S. PATENT DOCUMENTS 6,296,805 B1 10/2001 Laurent et al.
2021/0039355 A1* 2/2021 Mitsunobu .............. C23C 28/02

FOREIGN PATENT DOCUMENTS

JP 2000-38640 A 2/2000
JP 2003-49256 A 2/2003
(Continued)

*Primary Examiner* — Michael E. La Villa
(74) *Attorney, Agent, or Firm* — Birch, Stewart, Kolasch & Birch, LLP

(57) ABSTRACT

There is provided a hot-stamped body including: a steel base metal; and a metallic layer formed on a surface of the steel base metal, wherein the metallic layer includes: an interface layer that contains, in mass %, Al: 30.0 to 36.0%, has a thickness of 100 nm to 5 μm, and is located in an interface between the metallic layer and the steel base metal; and a principal layer that includes coexisting $MgZn_2$ phases and insular $FeAl_2$ phases, is located on the interface layer, and has a thickness of 3 μm to 40 μm.

5 Claims, 3 Drawing Sheets

(51) Int. Cl.
| | |
|---|---|
| C22C 38/28 | (2006.01) |
| C22C 38/06 | (2006.01) |
| C22C 38/04 | (2006.01) |
| C22C 38/02 | (2006.01) |
| C22C 38/00 | (2006.01) |
| C22C 30/02 | (2006.01) |
| C22C 30/06 | (2006.01) |
| C22C 18/04 | (2006.01) |
| C23C 2/12 | (2006.01) |
| C23C 2/06 | (2006.01) |
| C23C 2/28 | (2006.01) |
| B21D 22/02 | (2006.01) |
| C23C 28/02 | (2006.01) |
| C21D 1/673 | (2006.01) |
| C21D 1/76 | (2006.01) |
| C22C 21/10 | (2006.01) |
| C22C 30/00 | (2006.01) |
| C22C 18/00 | (2006.01) |
| B21D 22/20 | (2006.01) |
| C22C 21/00 | (2006.01) |
| C23C 18/04 | (2006.01) |
| B32B 15/18 | (2006.01) |
| B32B 15/04 | (2006.01) |
| B32B 15/20 | (2006.01) |
| C23C 30/00 | (2006.01) |
| C23C 28/00 | (2006.01) |
| C23C 8/12 | (2006.01) |
| C21D 8/00 | (2006.01) |
| C21D 9/00 | (2006.01) |
| C21D 1/18 | (2006.01) |
| C21D 1/34 | (2006.01) |
| C21D 1/40 | (2006.01) |

(52) U.S. Cl.
CPC ............ *B32B 15/01* (2013.01); *B32B 15/013* (2013.01); *B32B 15/04* (2013.01); *B32B 15/043* (2013.01); *B32B 15/18* (2013.01); *B32B 15/20* (2013.01); *C21D 1/673* (2013.01); *C21D 1/76* (2013.01); *C21D 8/005* (2013.01); *C21D 9/0068* (2013.01); *C22C 18/00* (2013.01); *C22C 18/04* (2013.01); *C22C 21/00* (2013.01); *C22C 21/10* (2013.01); *C22C 30/00* (2013.01); *C22C 30/02* (2013.01); *C22C 30/06* (2013.01); *C22C 38/00* (2013.01); *C22C 38/001* (2013.01); *C22C 38/002* (2013.01); *C22C 38/004* (2013.01); *C22C 38/02* (2013.01); *C22C 38/04* (2013.01); *C22C 38/06* (2013.01); *C22C 38/28* (2013.01); *C22C 38/32* (2013.01); *C23C 2/06* (2013.01); *C23C 2/12* (2013.01); *C23C 2/28* (2013.01); *C23C 8/12* (2013.01); *C23C 18/04* (2013.01); *C23C 28/02* (2013.01); *C23C 28/021* (2013.01); *C23C 28/023* (2013.01); *C23C 28/025* (2013.01); *C23C 28/32* (2013.01); *C23C 28/321* (2013.01); *C23C 28/322* (2013.01); *C23C 28/3225* (2013.01); *C23C 28/345* (2013.01); *C23C 30/00* (2013.01); *C23C 30/005* (2013.01); *B32B 2311/12* (2013.01); *B32B 2311/20* (2013.01); *B32B 2311/22* (2013.01); *B32B 2311/24* (2013.01); *B32B 2311/30* (2013.01); *C21D 1/18* (2013.01); *C21D 1/34* (2013.01); *C21D 1/40* (2013.01); *C21D 2211/008* (2013.01); *Y10T 428/1259* (2015.01); *Y10T 428/1266* (2015.01); *Y10T 428/1275* (2015.01); *Y10T 428/12611* (2015.01); *Y10T 428/12618* (2015.01); *Y10T 428/12736* (2015.01); *Y10T 428/12743* (2015.01); *Y10T 428/12757* (2015.01); *Y10T 428/12764* (2015.01); *Y10T 428/12792* (2015.01); *Y10T 428/12799* (2015.01); *Y10T 428/12951* (2015.01); *Y10T 428/12958* (2015.01); *Y10T 428/12972* (2015.01); *Y10T 428/12979* (2015.01); *Y10T 428/2495* (2015.01); *Y10T 428/24967* (2015.01); *Y10T 428/26* (2015.01); *Y10T 428/263* (2015.01); *Y10T 428/264* (2015.01); *Y10T 428/265* (2015.01)

(58) Field of Classification Search
CPC ......... C22C 18/04; C22C 21/10; C22C 21/00; C22C 30/00; C22C 30/02; C22C 30/06; C22C 38/00; C22C 38/001; C22C 38/002; C22C 38/004; C22C 38/02; C22C 38/04; C22C 38/06; C22C 38/28; C22C 38/32; C23C 2/06; C23C 2/12; C23C 2/28; C23C 8/12; C23C 18/04; C23C 30/00; C23C 30/005; C23C 28/02; C23C 28/023; C23C 28/025; C23C 28/321; C23C 28/3225; C23C 28/322; C23C 28/345; C23C 28/32; C23C 28/021; Y10T 428/1259; Y10T 428/12611; Y10T 428/12618; Y10T 428/1266; Y10T 428/12736; Y10T 428/12743; Y10T 428/1275; Y10T 428/12757; Y10T 428/12764; Y10T 428/12792; Y10T 428/12799; Y10T 428/12951; Y10T 428/12972; Y10T 428/12979; Y10T 428/12958; Y10T 428/24967; Y10T 428/2495; Y10T 428/26; Y10T 428/263; Y10T 428/264; Y10T 428/265
See application file for complete search history.

(56) References Cited

FOREIGN PATENT DOCUMENTS

| | | |
|---|---|---|
| JP | 2003-73774 A | 3/2003 |
| JP | 2005-113233 A | 4/2005 |
| JP | 2012-41610 A | 3/2012 |
| JP | 2012-112010 A | 6/2012 |
| WO | WO 02/103073 A2 | 12/2002 |

* cited by examiner

HOT-STAMPED BODY

TECHNICAL FIELD

The present invention relates to a hot-stamped body.

BACKGROUND ART

Some structural members (pressed bodies) used for automobiles and the like may in some cases be produced by hot stamping (hot pressing) in order to increase both strength and dimensional accuracy. In a case where a pressed body is produced by the hot stamping, a steel sheet is heated to its $Ac_3$ point or higher and then pressed by using press mold while rapidly cooled. In other words, in this production, pressing and quenching are performed at the same time. By performing the hot stamping, a pressed body having a high dimensional accuracy and a high strength can be produced.

On a pressed body produced by the hot stamping, scales are formed on a surface because the pressed body is processed at high temperature. Patent Documents 1 to 5 disclose techniques to inhibit the formation of scales and increase corrosion resistance by using plated steel sheets as steel sheets to be hot-stamped.

For example, JP2000-38640A (Patent Document 1) discloses a steel sheet to be hot-pressed with Al plating. JP2003-49256A (Patent Document 2) discloses an aluminum-plated steel sheet for a high-strength automobile member, on which an Al-plating layer is formed. JP2003-73774A (Patent Document 3) discloses a steel sheet to be hot-pressed on which a Zn-plating layer is formed. JP2005-113233A (Patent Document 4) discloses a Zn-base-plated steel material to be hot-pressed in which various elements including Mn are added to a plating layer of the Zn-plated steel sheet. JP2012-112010A (Patent Document 5) discloses a plated steel material for which an Al—Zn-based alloy plating is used.

LIST OF PRIOR ART DOCUMENTS

Patent Document

Patent Document 1: JP2000-38640A
Patent Document 2: JP2003-49256A
Patent Document 3: JP2003-73774A
Patent Document 4: JP2005-113233A
Patent Document 5: JP2012-112010A

SUMMARY OF INVENTION

Technical Problem

Patent Document 1 discloses that the formation of scales and decarburization are inhibited in hot stamping by its technique. However, such a hot stamping body has a plating layer mainly based on Al plating, and thus the hot stamping body tends to be poorer in sacrificial protection property than a plated steel sheet having a plating layer mainly based on Zn, which is unsatisfactory in a viewpoint of rust prevention. Patent Document 2, which relates to a plated steel sheet having a plating layer mainly based on Al plating, has the same problem.

By the techniques of Patent Document 3 and Patent Document 4, Zn remains in an outer layer of the steel material after hot stamping, and thus a high sacrificial protecting action can be expected. However, in these Zn-based plated steel materials, a large amount of Fe elements diffuses from their base irons into their plating layers, raising a problem in that red rust is formed in an early stage. Moreover, since the steel sheet is processed while Zn is melted, the melted Zn enters the steel sheet, and embrittlement can occur inside the steel material. This embrittlement is called liquid metal embrittlement (hereinafter, referred to also as "LME"). The LME then causes deterioration in fatigue properties of the steel sheet.

In a case where the plated steel sheet of Patent Document 5 is subjected to hot stamping, Zn in its liquid phase is generated even in the Al—Zn-based-alloy plated steel sheet, causing the LME. In addition, in the Al—Zn-based-alloy plated steel sheet, its plating layer is alloyed, and a large amount of Fe elements diffuse from its base iron into the plating layer, which can cause the formation of red rust.

Hot-stamped bodies are used mainly as automobile structure members and can be subjected to spot welding after being hot stamped. In general, setting a large plating thickness is effective to increase corrosion resistance; however, in a case where a thickness of a plating layer is large, Al and Zn contained in the plating layer react with Cu of a spot welding electrode, significantly decreasing an continuous spotting property in the spot welding. It is therefore difficult for a hot-stamped body made of a plated steel sheet to establish compatibility between sufficient corrosion resistance and spot weldability.

The present invention is made in view of the problems and has an objective to provide a novel and improved pressed body having enhanced fatigue properties, corrosion resistance, and spot weldability.

Solution to Problem

To achieve the objective, the present inventors conducted intensive studies about a plating steel sheet including a Zn—Al—Mg-based plating layer. Consequently, the present inventors obtained the following findings.

FIG. 1 illustrates a plated steel sheet 10a that is produced under normal conditions. The steel materials 10a includes a plating layer 13a on a surface of a base metal 11a and includes a diffusion layer 12a between the base metal 11a and the plating layer 13a, and the diffusion layer 12a is made by diffusion of Fe in a base iron into the plating layer.

FIG. 2 illustrates a typical hot-stamped body 20a. The hot-stamped body 20a includes a near-surface portion 2a having a constant thickness on a surface of a base metal 1a. The near-surface portion 2a has a layered structure that includes an interface layer 21a and a metallic layer 21b disposed in this order from the base metal 1a and includes an oxide layer 4a as its outermost layer.

The plated steel sheet 10a produced under the normal conditions is hot-stamped into the hot-stamped body 20a under the normal conditions. The interface layer 21a of the hot-stamped body 20a is a portion derived from the diffusion layer 12a of the plated steel sheet 10a produced under the normal conditions. The interface layer 21a includes a portion that is the plating layer 13a into which Fe in the base iron diffuses in hot stamping. A chemical composition of the interface layer 21a varies depending on chemical compositions of the base metal 11a and the plating layer 13a; for example, in a case of the plating layer 13a containing Al, Mg, and the like and mainly based on Zn, the interface layer 21a becomes a layer formed of Fe—Al phases such as $Fe_2(Al, Zn)_5$ and $Fe(Al, Zn)_3$, and in a case of the plating layer 13a containing Si in a large amount, the interface layer 21a becomes a layer formed of Fe—Al—Si phases such as Fe$_3$(Al, Si) and Fe(Al, Si). The oxide layer 4a is an oxide layer mainly based on Zn.

The diffusion layer 12a in the plating layer of the plated steel sheet 10a produced under the normal conditions is thick, which causes various problems in the hot stamping. Specifically, Zn in the plating layer 13a is brought into a liquid phase state and vaporized in heating in the hot stamping, and thus an amount of Zn in the metallic layer 21b is decreased. In addition, Zn in the plating layer 13a reacts with the interface layer 21a in the hot stamping, and thus the amount of Zn in the metallic layer 21b is decreased. Therefore, in a case where the hot stamping is performed on the plated steel sheet 10a produced under the normal conditions, Zn having a sacrificial protecting action resists remaining in the plating layer (in the metallic layer 21b of the hot-stamped body 20a), raising a problem in that corrosion resistance is significantly decreased. In addition, the vaporization of Zn causes increase in a thickness of the oxide layer 4a, consequently leading to decrease in spot weldability.

To solve the problem, the present inventors investigated a relation between a plated steel sheet 10a produced under the normal conditions and a hot-stamped body 20a, and consequently found production conditions for decreasing a thickness of a diffusion layer 12a of a plated steel sheet 10a.

A plating bath temperature is typically set within a range of about 50° C. to 100° C. +a melting temperature of plating, in order to form a uniform plating layer 13a. This is because if the temperature of the plating bath is close to the melting temperature, the plating bath partially solidifies to form dross in production, which tends to degrade cleanliness of a surface of the plating layer.

In addition, in order to cause Fe to diffuse into the plating layer 13a sufficiently, a time of immersion in the plating bath is typically set at 5 seconds or more. Moreover, a temperature of the steel sheet before immersed in the plating bath (preintroduction sheet temperature) is typically retained at 0 to −15° C.+a plating bath temperature. This is because increasing the temperature of the plating bath is easy, while decreasing the temperature of the plating bath is difficult, and thus if the preintroduction sheet temperature is high, the plating bath needs to be cooled. In this regard, for example, according to Patent Document 5, a preintroduction sheet temperature is set at a temperature ranging from a plating bath temperature (° C.) to the plating bath temperature −10 (° C.) in all Examples.

However, for the plated steel sheet 10a produced under such normal plating conditions (the plating bath temperature is about 50 to 100° C.+the melting temperature of plating, the time of immersion is 5 seconds or more, the preintroduction sheet temperature of the steel sheet is 0 to −15° C.+the plating bath temperature, etc.), the plating bath temperature and the time of immersion are predominant, which brings about a state where Fe easily diffuses to a plating side. Refer to FIG. 1, in the plated steel sheet 10a produced under the normal conditions, in an outer layer of its base metal (base iron), a diffusion layer 12a that is made of Fe$_2$(Al, Zn)$_5$ and Fe(Al, Zn)$_3$, or Fe$_3$(Al, Si), Fe(Al, Si), and the like in a case where the plating contains a large amount of Si, grows thickly (1 µm or more) between the base iron and the plating layer.

Hence, the present inventors produced a plated steel sheet under conditions including a plating bath temperature, a time of immersion, and a preintroduction sheet temperature of the steel sheet, which are different from those of the normal plating conditions, and succeeded to reduce a thickness of its diffusion layer 12a than before.

First, a temperature of plating bath and a time of immersion in the plating bath matter. If a temperature of plating bath is excessively high, the diffusion layer 12a made of Fe$_2$(Al, Zn)$_5$ and the like in the plated steel sheet grows to 1 µm or more, forming a thick interface layer in the hot-stamped body, which makes formation of a laminar metallic layer unavoidable. In addition, even when the temperature of the plating bath is lowered, the same problem arises if the time of immersion is excessively long. Therefore, the plating bath temperature is lowered as much as possible; specifically, the temperature is limited to a melting temperature of plating +5 to 20° C., and the time of immersion is limited to 1 to 3 seconds. The diffusion layer 12 that grows between the base metal (base iron) 11 and the plating layer 13 under such conditions becomes a thin layer mainly based on Fe$_2$(Al, Zn), with reference to FIG. 3. With such a diffusion layer 12, the plated steel sheet 10 does not cause the interface layer made of Fe$_2$(Al, Zn)$_5$ and the like to grow even when subjected to the hot stamping thereafter.

Secondly, the present inventors studied the introduction temperature of the steel plate into the plating bath. In the present invention, by lowering the temperature of the plating bath and shortening the time of immersion, growth of the diffusion layer 12 made of Fe$_2$(Al, Zn)$_5$ and the like, which results in a thickness interface layer afterward, can be inhibited. However, if a preintroduction sheet temperature is lower than the temperature of the plating bath, there is a concern that the plating bath solidifies, which impairs cleanliness of the plating layer 13. On the other hand, if the introduction temperature is excessively high, there is a problem in that a cooling rate decreases, which causes the diffusion layer 12 made of Fe$_2$(Al, Zn)$_5$ and the like to grow thickly. With consideration given to these problems, the preintroduction sheet temperature is set at the plating bath temperature +5 to 20° C.

In addition to the production conditions described above, the present inventors further carried out an idea of causing the plating layer 13 to contain 7.0% or more of Mg. Mg binds with Zn in the plating layer 13 to form MgZn$_2$ phases 32a. This prevents the LME, in which melted Zn enters the steel sheet in the hot stamping, and embrittlement occurs inside the steel material, and prevents decrease in the spot weldability caused by the melted Zn. By causing the plating layer 13 to contain Mg, it is possible in the hot stamping to inhibit Fe in the base metal from breaking through the thin diffusion layer 12 and diffusing into the plating layer 13. In addition, an excessive reaction between the base iron and mixtures of Zn, Al, or Zn and Al with Fe can be inhibited, and the growth of the diffusion layer 12 can be also inhibited. Moreover, a trace amount of Fe contained in the plating layer 13 can react with Al to form insular FeAl$_2$ phases 32b.

Furthermore, the present inventors unexpectedly found that FeAl$_2$ phases 32b of the hot-stamped body are insular. The insular FeAl$_2$ phases 32b are intermetallic compounds having a high fusing point and thus are considered to have effects of increasing an continuous spotting property during spot welding and inhibiting the LME.

FIG. 3 is a schematic diagram illustrating a plated steel sheet produced under conditions found by the present inventors as described above. FIG. 4 is a schematic diagram illustrating a hot-stamped body produced by performing hot stamping on the plated steel sheet produced under the conditions found by the present inventors as described above. As illustrated in FIG. 4, the hot-stamped body 20 manufactured under the conditions found by the present inventors includes a thin interface layer 31 and a principal layer 32 in a state where MgZn$_2$ phases 32a and insular FeAl$_2$ phases 32b coexist. The insular FeAl$_2$ phases 32b are intermetallic compounds having a high fusing point and thus have effects of increasing an continuous spotting property during the spot welding and inhibiting the LME.

The present invention is made based on the above findings, and the gist of the present invention is as follows.

(1) A hot-stamped body comprising:
a steel base metal; and
a metallic layer formed on a surface of the steel base metal, wherein
the metallic layer includes an interface layer and a principal layer,
the interface layer contains, in mass %, Al: 30.0 to 36.0%, has a thickness of 100 nm to 5 µm, and is located in an interface between the metallic layer and the steel base metal,
the principal layer includes coexisting MgZn$_2$ phases and insular FeAl$_2$ phases, has a thickness of 3 µm to 40 µm, and is located on the interface layer,
an average composition of the metallic layer consists of, in mass %:
Al: 20.0 to 45.0%;
Fe: 10.0 to 45.0%;
Mg: 2.0 to 10.0%;
Sb: 0 to 0.5%;
Pb: 0 to 0.5%;
Cu: 0 to 1.0%;
Sn: 0 to 1.0%;
Ti: 0 to 1.0%;
Ca: 0 to 3.0%;
Sr: 0 to 0.5%;
Cr: 0 to 1.0%;
Ni: 0 to 1.0%;
Mn: 0 to 1.0%;
Si: 0 to 1.0%; and
the balance: 12.0 to 45.0% of Zn and impurities,
in the principal layer, the MgZn$_2$ phases each contain, in mass %:
Mg: 13.0 to 20.0%.
Zn: 70.0 to 87.0%;
Al: 0 to 8.0%; and
Fe: 0 to 5.0%, and
in the principal layer, the FeAl$_2$ phases each contain, in mass %:
Al: 40.0 to 55.0%;
Fe: 40.0 to 55.0%; and
Zn: 0 to 15.0%.

(2) The hot-stamped body according to the above (1), wherein
in the principal layer,
a volume fraction of the FeAl$_2$ phases is 50.0 to 80.0%, and
a volume fraction of the MgZn$_2$ phases is 20.0 to 50.0%.

(3) The hot-stamped body according to the above (1) or (2), wherein
in the principal layer,
a volume fraction of the FeAl$_2$ phases is 60.0 to 75.0%, and
a volume fraction of the MgZn$_2$ phases is 25.0 to 45.0%.

Advantageous Effect of Invention

According to the present invention, a hot-stamped body that is excellent in fatigue characteristics, spot weldability, and corrosion resistance after coating.

DESCRIPTION OF EMBODIMENT

A hot-stamped body being an embodiment of the present invention, a plated steel sheet used for obtaining the hot-stamped body, and a method for producing the hot-stamped body will be described below. The symbol "%" for each content is to mean "mass %" unless otherwise noted.

1. Hot-Stamped Body 20

Figure 4:
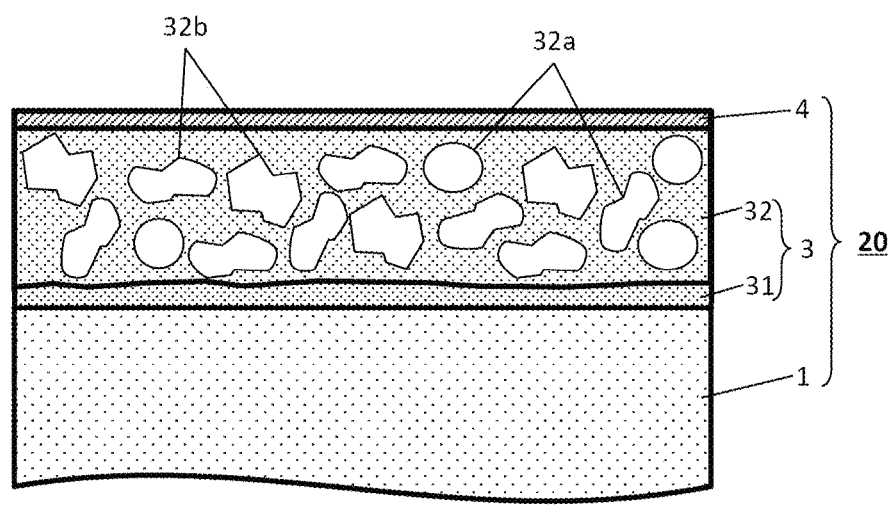
FIG. 4 is a schematic diagram illustrating a hot-stamped body obtained from the plated steel sheet produced under the conditions found by the present inventors.
Figure 5:
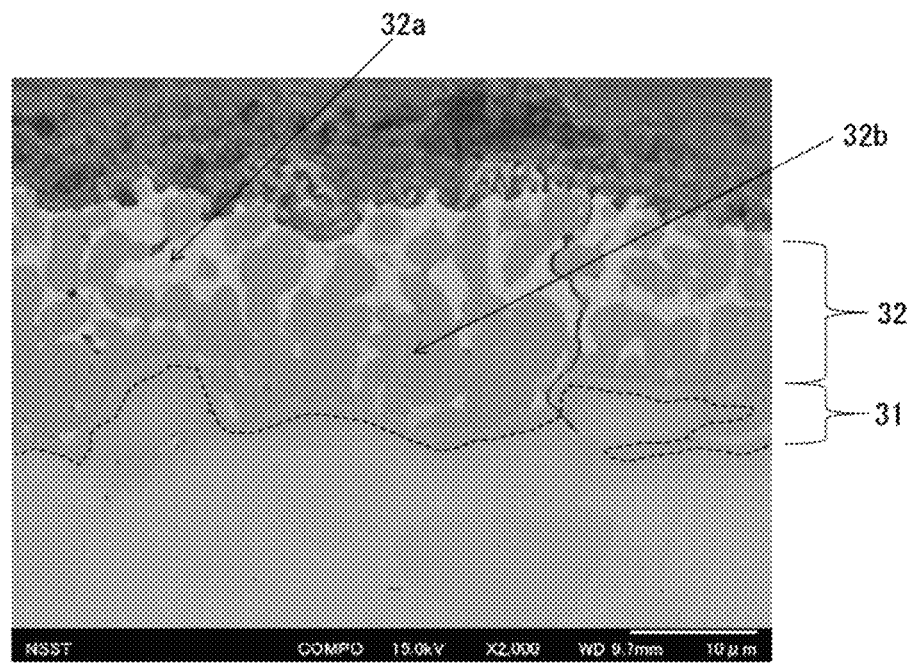
FIG. 5 is a backscattered electron image of a cross section of a metallic layer of a hot-stamped body according to an embodiment of the present invention.

With reference to FIG. 4 and FIG. 5, an outline of a hot-stamped body 20 according to the present embodiment will be described. With reference to FIG. 4 and FIG. 5, the hot-stamped body 20 according to the present embodiment includes a steel base metal (hereinafter, referred to simply as a "base metal") 1 and a metallic layer 3, the metallic layer 3 includes an interface layer 31 and a principal layer 32 on its interface facing the base metal 1, and the principal layer 32 includes MgZn$_2$ phases 32a and insular FeAl$_2$ phases 32b that coexist. On an outer surface of the metallic layer 3, an oxide layer 4 can be present. However, thanks to a chemical composition of the plating layer 13, particularly a relation between Zn and Mg components, laminar oxides resist being formed in a cross section of the plating over the entire surface of the plated steel sheet. Therefore, oxides of Zn, Mg, and Ca components and the like adhere partially to the oxide layer 4 in trace amounts even when observed. In some cases, this oxide layer 4 is not left on a surface of a finished product by being removed by alkali treatment in a process such as chemical treatment.

1-1. Base Metal 1

There is no specific constraint placed on the base metal 1 as long as the base metal 1 has properties suitable for applications of the hot-stamped body 20 according to the present embodiment. As the base metal 1, for example, a steel having the following chemical composition can be used.

C: 0.05% to 0.40%

C (carbon) is an element effective in increasing a strength of the hot-stamped body, but if a content of C is excessively high, C decreases a toughness of the hot-stamped body. Accordingly, the content of C is set at 0.05% to 0.40%. A preferable lower limit of the content of C is 0.10%, and a more preferable lower limit of the content of C is 0.13%. A preferable upper limit of the content of C is 0.35%.

Si: 0.5% or less

Si (silicon) is an element effective in deoxidizing the steel. However, if a content of Si is excessively high, Si diffuses in the steel during heating in hot stamping to form its oxide in a surface of the steel sheet, and as a result, an efficiency of phosphate treatment is decreased. Si is also an element that raises an Ac$_3$ point of the steel. For that reason, excessively containing Si causes an Ac$_3$ point of the steel sheet to rise, increasing a heating temperature in the hot stamping, which makes vaporization of Zn in the plating layer inevitable. Accordingly, the content of Si is set at 0.5% or less. A preferable upper limit of the content of Si is 0.3%, and a more preferable upper limit of the content of Si is 0.2%. A preferable lower limit of the content of Si is, but differs depending on a required deoxidation level, normally 0.05%.

Mn: 0.5% to 2.5%

Mn (manganese) increases hardenability and increases the strength of the hot-stamped body. Even if Mn is contained excessively, its effect levels off. Accordingly, a content of Mn is set at 0.5% to 2.5%. A preferable lower limit of the content of Mn is 0.6%, and a more preferable lower limit of the content of Mn is 0.7%. A preferable upper limit of the content of Mn is 2.4%, and a more preferable lower limit of the content of Mn is 2.3%.

P: 0.03% or less

P (phosphorus) is an impurity contained in the steel. P segregates in crystal grain boundaries, decreasing the toughness of the steel and decreasing delayed fracture resistance. Accordingly, a content of P is set at 0.03% or less. The content of P is preferably as low as possible, and preferably set at 0.02% or less. Excessive reduction of the content of P leads to increase in costs, and accordingly a preferable lower limit of the content of P is 0.01%.

S: 0.01% or less

S (sulfur) is an impurity contained in the steel. S forms its sulfides, decreasing the toughness of the steel and decreasing the delayed fracture resistance. Accordingly, the content of S is set at 0.01% or less. The content of S is preferably as low as possible, and preferably set at 0.005% or less. Excessive reduction of the content of S leads to increase in costs, and accordingly a preferable lower limit of the content of S is 0.0001%.

sol. Al: 0.1% or less

Al (aluminum) is effective in deoxidizing the steel. However, excessively containing Al causes the $Ac_3$ point of the steel sheet to rise, increasing the heating temperature in the hot stamping, which makes the vaporization of Zn in the plating layer inevitable. The rise in the $Ac_3$ point of the steel can cause the heating temperature in the hot stamping to exceed an evaporating temperature of Zn in the plating layer. Accordingly, a content of Al is set at 0.1% or less. A preferable upper limit of the content of Al is 0.05%, and a more preferable lower limit of the content of Al is 0.01%. In the present specification, the content of Al means a content of sol. Al (acid-soluble Al).

N: 0.01% or less

N (nitrogen) is an impurity unavoidably contained in the steel. N forms its nitrides, decreasing the toughness of the steel. In a case where B (boron) is additionally contained in the steel, N binds with B to decrease an amount of dissolved B, decreasing hardenability. Accordingly, a content of N is set at 0.01% or less. The content of N is preferably as low as possible, and preferably set at 0.005% or less. Excessive reduction of the content of N leads to increase in costs, and accordingly a preferable lower limit of the content of N is 0.0001%.

B: 0 to 0.005%

B (boron) increases a hardenability of the steel and increases a strength of the steel sheet subjected to the hot stamping, and therefore, B may be contained in the base metal. However, even if B is contained excessively, its effect levels off. Accordingly, a content of B is set at 0 to 0.005%. A preferable lower limit of the content of B is 0.0001%.

Ti: 0 to 0.1%

Ti (titanium) binds with nitrogen (N) to form its nitride, enabling inhibition of decrease in hardenability due to BN formation. Ti can exert a pinning effect to refine austenite grains in diameter during the heating in the hot stamping, increasing a toughness and the like of the steel sheet. Therefore, Ti may be contained in the base metal. However, even if Ti is contained excessively, its effect levels off, and in addition, if a Ti nitride precipitates excessively, the toughness of the steel is decreased. Accordingly, a content of Ti is set at 0 to 0.1%. A preferable lower limit of the content of Ti is 0.01%.

Cr: 0 to 0.5%

Cr (chromium) is effective in increasing the hardenability of the steel and increasing a strength of a hot-stamped product, and therefore, Cr may be contained in the base metal. However, if a content of Cr is excessively high, and a Cr carbide, which resists melting in heating during the hot stamping, is formed in a large amount, it becomes difficult for austenitization of the steel to proceed, which rather decreases the hardenability. Accordingly, the content of Cr is set at 0 to 0.5%. A preferable lower limit of the content of Cr is 0.1%.

Mo: 0 to 0.5%

Mo (molybdenum) increases the hardenability of the steel and thus may be contained in the base metal. However, even if Mo is contained excessively, the effect levels off. Accordingly, a content of Mo is set at 0 to 0.5%. A preferable lower limit of the content of Mo is 0.05%.

Nb: 0 to 0.1%

Nb (niobium) is an element that forms its carbide to refine grains in the hot stamping, increasing the toughness of the steel, and thus may be contained in the base metal. However, even if Nb is contained excessively, the effect levels off, and in addition, the hardenability is decreased. Accordingly, a content of Nb is set at 0 to 0.1%. A preferable lower limit of the content of Nb is 0.02%.

Ni: 0 to 1.0%

Ni (nickel) can inhibit embrittlement attributable to melted Zn during the heating in the hot stamping, and thus may be contained in the base metal. However, even if Ni is contained excessively, the effect levels off. Accordingly, a content of Ni is set at 0 to 1.0%. A preferable lower limit of the content of Ni is 0.1%.

The balance of the chemical composition of the base metal constituting the hot-stamped body according to the present embodiment consists of Fe and impurities. As used herein, the term "impurities" refers to components that may be contained in ores or scraps being raw materials or components that may be mixed in a steel material in producing the steel material industrially, attributable to a production environment, and are allowed to be mixed in the steel material within ranges in which the impurities do not interfere with the advantageous effects of the present invention. Note that optional additional elements may be contained in the base metal as the impurities.

1-3. Metallic Layer 3

(a) Interface Layer 31

The interface layer 31 is a layer made by an Al component in the plating layer diffusing into the base metal (base iron) and binding with Fe by the heating in the hot stamping, and constituted by an intermetallic compound mainly based on Fe—Al (hereinafter, referred to as simply "Fe—Al").

Fe—Al is an intermetallic compound having a constant atomic ratio. An elementary composition ratio of Fe—Al (mass %) is Al: about 33% to Fe: about 67%. A transmission electron microscope (TEM) observation reveals that, in the interface layer 31, $Al_3Fe$ phases having a high concentration of Al can be formed in its very outer layer as fine precipitates not forming a layer, and $Fe_3Al$ phases and the like can be formed in a vicinity of the base metal as fine precipitates not forming a layer. In addition, a quantitative analysis on the layer with a magnification of about ×5000 by, for example, the scanning electron microscope—energy dispersive X-ray spectroscopy (SEM-EDX) reveals that its content of Al varies within a range from 30.0 to 36.0%. Accordingly, a content of Al in the interface layer is set within a range from 30.0 to 36.0%.

Note that, depending on the chemical compositions of the base metal and the plating layer of the plated steel sheet, the intermetallic compound mainly based on Fe—Al may contain small amounts of Zn, Mn, and Ni that are dissolved in Fe—Al. It therefore can be said that the intermetallic compound mainly based on Fe—Al contains Al: 30.0 to 36.0% and the balance substantially consists of Fe. Here, the term "substantially" means that containing less than 3% of other components (e.g., Zn, Mn, Si, and Ni) is allowable.

Here, the interface layer serves as a barrier coating for the base metal and has a certain level of corrosion resistance. The interface layer therefore can inhibit the base iron from being eluted at a time of undercoating corrosion and inhibit formation of running red rust that develops from a cut in a corrosion test or the like (specifically, red rust forming streaks running from the cut). To obtain this effect, a thickness of the interface layer is set at 100 nm or more. However, if the thickness of the interface layer is excessively large, red rust formed from Fe—Al itself forms running red rust, and thus the thickness of the interface layer is set at 5 µm or less. Therefore, the thickness of the interface layer is set at 100 nm or more and 5 µm or less. In order to check a rust proofing effect clearly, a lower limit of the thickness of the interface layer is preferably set at 500 nm and an upper limit of the thickness of the interface layer is preferably set at 2 µm. The upper limit is more preferably set at 1 µm.

(b) Principal Layer 32

With reference to FIG. 4 and FIG. 5, the principal layer 32 is a layer in a state where the $MgZn_2$ phases 32a and the insular $FeAl_2$ phases 32b coexist. The principal layer 32 has an effect of inhibiting generation of scales in the hot stamping and contributes to a corrosion resistance of the hot-stamped body 20. The corrosion resistance of the hot-stamped body 20 is exerted by an action of affording sacrificial protection by the principal layer 32 to prevent the base metal (base iron) from rusting and an action of keeping an adhesiveness between the principal layer 32 and a coating in its upper layer (not illustrated) not to expand a rust area.

The state where the $MgZn_2$ phases 32a and the insular $FeAl_2$ phases 32b coexist means that the insular $FeAl_2$ phases 32b disperse (scatter) over the principal layer 32. How the insular $FeAl_2$ phases 32b disperse is specifically illustrated in FIG. 5. The insular $FeAl_2$ phases 32b include single insular $FeAl_2$ phases 32b, as well as agglomerations of a plurality of neighboring insular $FeAl_2$ phases 32b.

Figure 6:
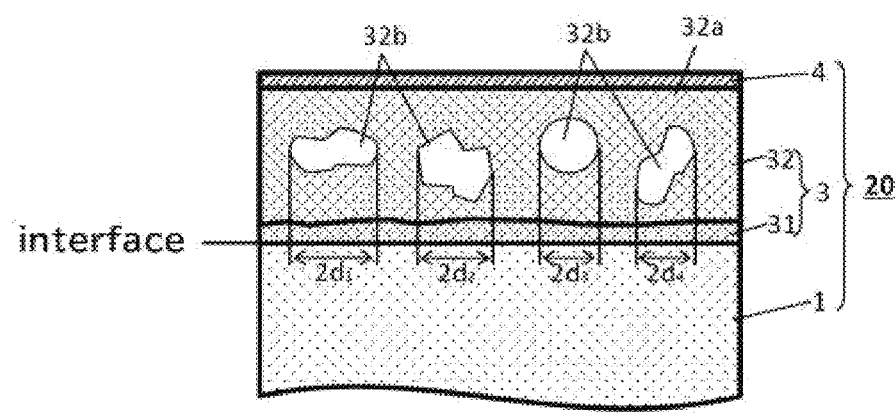
FIG. 6 is a schematic diagram illustrating a definition of insular FeAl$_2$ phases in a hot-stamped body according to an embodiment of the present invention.

The present invention has a feature in that the $FeAl_2$ phases 32b are insular. Assume that 2d denotes a length of a projection of an $FeAl_2$ phase 32b onto an interface between the metallic layer 3 and the base metal 1 (see $2d_1$, $2d_2$, $2d_3$, and $2d_4$ in FIG. 6), and L denotes a perimeter of the $FeAl_2$ phase 32b; a ratio perimeter R is calculated using measured 2d and L and formula below, and an $FeAl_2$ phase of which R is 2 or more is determined to be insular.

$$R=L/2d\geq 2$$

The insular $FeAl_2$ phases 32b are not phases that grow in a laminar manner into the plating layer from a base iron side of an interface between the plating layer and the base iron, but phases that grow from nuclei formed spherically in the plating layer. When an actual, cross-sectional steel microstructure is observed, a state where spherical phases come into contact with and adhere to one another is observed. Three-dimensionally, the insular $FeAl_2$ phases 32b grow spherically and therefore have large contact areas with the $MgZn_2$ phases inside the principal layer as compared with laminar $FeAl_2$ phases in the plating layer/base iron interface formed by a usual production method.

Details on how the insular $FeAl_2$ phases 32b are formed are not clarified, but the following can be hypothesized. The diffusion layer 12 ($Fe_2(Al, Zn)_5$, etc.) in the plated steel sheet 10 before subjecting to the hot stamping according to the present invention has a thickness that is as thin as less than 1 µm and has a low solubility of Si into the diffusion layer 12, and thus a chemical bond of the diffusion layer 12 is not very strong. Therefore, at a time when the plated steel sheet 10 is produced, a trace amount of Fe disperses through the diffusion layer 12 into the plating layer 13. In addition, also during the heating in the hot stamping, Fe in the base metal diffuses through the diffusion layer 12 into the plating layer 13 in a melted state. It is inferred that, in the hot stamping, the trace amount of dispersing Fe in the plating layer serves as nucleus forming sites to bind with Al atoms and Zn atoms, growing into insular shapes.

In a case where insular $FeAl_2$ phases are formed, fuming nitric acid is used to dissolve the plating layer 13 before the heating, and from the resultant solution, 0.05 to 0.5% of Fe is detected. In contrast, in a case where the plated steel sheet 10a produced under the normal conditions, it is considered that the diffusion of Fe in the base metal does not reach the plating layer 13a in a melted state, which in turn causes the interface layer 21a including $Fe_2(Al, Zn)_5$ and the like to grow, and the resultant hot-stamped body 20a has a layered structure.

The $MgZn_2$ phases 32a are intermetallic compounds, and thus its concentration of constituents derived from its atomic ratio is substantially constant: its concentration of Mg is about 16.0%, and its concentration of Zn is about 84.0%. However, in the $MgZn_2$ phases, Al is dissolved within a range from 0 to 8.0%, and Fe is dissolved within a range from 0 to 5.0%; therefore, the concentration of Mg is defined as a range from 13.0 to 20.0%, and the concentration of Zn is defined as a range from 70.0 to 87.0%. The balance, other than these components, consists of impurities. Examples of the impurities include 0 to 0.01% of Ni and 0 to 0.01% of Si.

The insular $FeAl_2$ phases 32b are intermetallic compound, and thus its concentration of constituents derived from its atomic ratio is substantially constant: its concentration of Al and its concentration of Fe are both about 50.0%. However, in the $FeAl_2$ phases, Zn is dissolved within a range from 0 to 15.0%; therefore, the concentration of Al is defined as a range from 40.0 to 55.0%, and the concentration of Fe is defined as a range from 40.0 to 55.0%. The balance, other than these components, consists of impurities. Examples of the impurities include 0 to 0.01% of Ni and 0 to 0.01% of Mn.

By the $FeAl_2$ phases 32b changing from laminar shapes to insular shapes, an Al component in the $MgZn_2$ phases 32a in the metallic layer is reduced, increasing an continuous spotting property during the spot welding. This is because the Al component present in the $MgZn_2$ phases 32a reacts with Cu electrodes for the spot welding, significantly decreasing the continuous spotting property. In addition, the FeAl$_2$ phases becoming not laminar but insular has an effect of inhibiting the melted Zn generated in the hot stamping from entering the base metal, so as to inhibit the LME. Note that only increasing an amount of FeAl$_2$ phases 32b simply rather degrades corrosion resistance, and therefore a balance between the amount and the shape of the FeAl$_2$ phases 32b is important.

There is no specific constraint placed on sizes of the insular FeAl$_2$ phases 32b, but excessively large insular FeAl$_2$ phases 32b may be unevenly distributed in the principal layer 32. The uneven distribution of the insular FeAl$_2$ phases 32b can adversely affect corrosion resistance and chipping resistance. Therefore, it is preferable that the sizes of the insular FeAl$_2$ phases 32b range as narrowly as possible, and it is preferable that the insular FeAl$_2$ phases 32b are not unevenly distributed.

By being contained in the principal layer 32, the MgZn$_2$ phases 32a can inhibit formation of red rust on the hot-stamped body. In general, as an amount of the MgZn$_2$ phases increases, the corrosion resistance increases. Moreover, the MgZn$_2$ phases 32a prevent Zn from being dissolved into the principal layer, inhibiting the generation of the Zn in its liquid phase during the heating in the hot stamping. The Zn in its liquid phase is generated also during the spot welding and reacts with the Cu electrodes to decrease the continuous spotting property. By causing the MgZn$_2$ phases 32a to be present in the principal layer 32, the generation of the Zn in its liquid phase can be inhibited, and the decrease in the continuous spotting property can be also inhibited. However, if an amount of the MgZn$_2$ phases is excessively large, there is a risk that the plating layer is deposited to press mold in the hot stamping or a risk that the LME occurs by creation of regions having a high concentration of Zn in the MgZn$_2$ phases.

It is therefore preferable that, in the principal layer 32, a volume fraction of the FeAl$_2$ phases 32b ranges from 50.0 to 80.0%, and a volume fraction of the MgZn$_2$ phases 32a ranges from 20.0 to 50.0%. As long as the volume fractions fall within these ranges, excellent corrosion resistance, spot weldability, LME property, and press mold deposition property are easily obtained. The volume fraction of the FeAl$_2$ phases 32b is preferably set within a range from 60.0 to 75.0%, and the volume fraction of the MgZn$_2$ phases 32a is preferably set within a range from 25.0 to 40.0%.

If the thickness of the principal layer 32 is less than 3 μm, the principal layer 32 cannot protect the base metal (base iron) sufficiently in a case where corrosion builds up, and thus the thickness of the principal layer 32 is set at 3 μm or more. As the thickness of the principal layer 32 is increased, the corrosion resistance tends to increase, but if the thickness is excessively large, the principal layer 32 has an adverse effect on spot weldability, and thus the thickness of the principal layer 32 is set at 40 μm or less. A lower limit of the thickness of the principal layer 32 is preferably set at 6 μm, more preferably 10 μm. An upper limit of the thickness of the principal layer 32 is preferably set at 30 μm, more preferably 25 μm.

(c) Average Composition of Metallic Layer 3

The metallic layer 3 has the following average composition.

Al: 20.0 to 45.0%

By the heating in the hot stamping, Al forms the interface layer 31 in a vicinity of the interface between the base metal 1 and the metallic layer 3 and generates FeAl$_2$ phases 32b in the principal layer 32; therefore, Al is an element essential to inhibit Fe from diffusing from the base metal 1 into the principal layer 32 excessively. If a content of Al in the metallic layer 3 is excessively low, the thickness of the interface layer 31 becomes small, which makes it easy for Fe to diffuse from the base metal 1 into the principal layer 32, and a content of Fe dissolved into the MgZn$_2$ phases 32a increases. Moreover, the FeAl$_2$ phases 32b in the principal layer 32 are reduced. This results in the decrease in spot weldability, the occurrence of the LME, and the occurrence of the deposition in the hot stamping. Therefore, a lower limit of the content of Al in the metallic layer 3 is set at 20.0%.

On the other hand, if the content of Al in the metallic layer 3 is excessively high, a concentration of Al dissolved in the MgZn$_2$ phases 32a in the metallic layer 3 becomes high, causing problems of weakening of sacrificial protecting action, decrease in undercoating corrosion resistance, and degradation in time taken for forming red rust. Therefore, an upper limit of the content of Al in the metallic layer 3 is set at 45.0%. A preferable lower limit of the content of Al is 25.0%, and a more preferable lower limit of the content of Al is 29.0%. A preferable upper limit of the content of Al is 44.0%, and a more preferable upper limit of the content of Al is 38.0%.

Fe: 10.0 to 45.0%

When the plated steel sheet is heated in the hot stamping, Fe diffuses from the base metal 1 into the metallic layer 3, and therefore, the metallic layer 3 of the hot-stamped body 20 necessarily contains Fe. Fe binds with Al in the metallic layer 3 to form the interface layer 31 and the FeAl$_2$ phases 32b in the principal layer 32. A concentration of Fe in the metallic layer 3 increases as the thickness of the interface layer 31 is increased and an amount of FeAl$_2$ phases 32b in the principal layer 32 is increased. If the concentration of Fe is low, the amount of the FeAl$_2$ phases 32b is reduced accordingly, which makes a structure of the principal layer 32 easy to crumble. Specifically, in a case where the concentration of Fe is less than 10.0%, the amount of the MgZn$_2$ phases 32a in the principal layer 32 is increased relatively, causing the spot weldability and the deposition property to tend to deteriorate, and thus a lower limit of a content of Fe in the metallic layer 3 is set at 10.0%. On the other hand, if the concentration of Fe is excessively high, the amount of FeAl$_2$ phases 32b is increased, the MgZn$_2$ phases 32a in the principal layer 32 is decreased relatively, which causes the structure of the principal layer 32 to tend to crumble, degrading the corrosion resistance, and thus an upper limit of the content of Fe in the metallic layer 3 is set at 45.0%. The lower limit of the content of Fe in the metallic layer 3 is preferably set at 20.0%, more preferably 27.0%, still more preferably 32.5%. The upper limit of the content of Fe in the metallic layer 3 is preferably set at 42.0%, more preferably 36.5%.

Mg: 2.0 to 10.0%

Mg is an element that is effective for increasing a corrosion resistance of the metallic layer 3 and improving undercoating swelling width in a corrosion test. Moreover, Mg binds with a Zn component in the metallic layer 3 during the heating in the hot stamping, preventing the generation of the Zn in its liquid phase, and thus Mg also has an effect of inhibiting the LME embrittlement. If a concentration of Mg in the metallic layer 3 is excessively low, the MgZn$_2$ phases are not formed, and dissolved Zn remains in the principal layer 32, increasing a risk of the occurrence of the LME. Accordingly, the content of Mg is set at 2.0% or more. On the other hand, the content of Mg in the metallic layer 3 is excessively high, the sacrificial protection works excessively, causing the coating swelling width and running rust to tend to sharply increase in a corrosion test. Accordingly, an upper limit of the content of Mg is set at 10.0%. The content of Mg is preferably set at 3.0% or more, more preferably 3.5% or more.

Sb: 0 to 0.5%
Pb: 0 to 0.5%
Cu: 0 to 1.0%
Sn: 0 to 1.0%
Ti: 0 to 1.0%

Sb (antimony), Pb (lead), Cu (copper), Sn (tin), and Ti (titanium) are replaced with Zn in the metallic layer 3 to form their solid solutions in the $MgZn_2$ phases, and as long as their contents fall within their respective predetermined contents, they have no adverse effect on the hot-stamped body 20. Therefore, these elements may be contained in the metallic layer 3. However, if a content of each element is excessively high, an oxide of the element precipitates during the heating in the hot stamping, which degrades a surface texture of the hot-stamped body 20 and causes a poor phosphoric chemical treatment, developing a tendency to degrade corrosion resistance after coating. In addition, red rust forms more shortly in a corrosion test. In a case where contents of Pb and Sn are excessively high, Pb and Sn degrade a deposition property and an LME property. The contents of Sb and Pb are set at 0.5% or less, and contents of Cu, Sn, and Ti are set at 1.0% or less. The contents of Sb and Pb are preferably set at 0.2% or less, and contents of Cu, Sn, and Ti are preferably set at 0.8% or less, more preferably 0.5% or less.

Ca: 0 to 3.0%
Sr: 0 to 0.5%

Ca (calcium) and Sr (strontium) can inhibit top dross from forming on plating bath in production. In addition, Ca and Sr tend to inhibit atmospheric oxidation during heat treatment in the hot stamping and thus can inhibit chromatic change of the plated steel sheet after the heat treatment. Sr strengthens these effects more than Ca, and thus the same effects are exerted by a smaller amount of Sr than Ca. Moreover, if contents of these elements are excessively high, these elements have adverse effects on the coating swelling width and the running rust in a corrosion test. Therefore, one or more selected from Ca and Sr may be contained in the metallic layer 3, with a content of Ca being 3.0% or less and a content of Sr being 0.5% or less. The content of Ca is preferably set at 2.0% or less, more preferably 1.5% or less. The content of Sr is preferably set at 0.3% or less, more preferably 0.1% or less. In order to obtain the effects described above, the content of Ca is preferably set at 0.1% or more, and the content of Sr is preferably set at 0.05% or more.

Cr: 0 to 1.0%
Ni: 0 to 1.0%
Mn: 0 to 1.0%

In the plated steel sheet, Cr, Ni, and Mn concentrate in and in a vicinity of the interface between the plating layer and the base metal and has an effect of removing spangles on a surface of the plating layer. These elements are replaced with Fe in the metallic layer 3 of the hot-stamped body 20 to be contained in the interface layer 31 or form their solid solutions in the $FeAl_2$ phases 32b in the principal layer 32. Therefore, one or more selected from Cr, Ni, and Mn may be contained in the metallic layer 3. However, if contents of these elements are excessively high, these elements tend to increase a coating swelling width and running rust, degrading the corrosion resistance. Accordingly, the contents of Cr, Ni, and Mn are each set at 1.0% or less. The contents of Cr, Ni, and Mn are each preferably set at 0.5%, more preferably 0.1% or less. Lower limits of the contents of Cr, Ni, and Mn are each preferably set at 0.01%.

Si: 0 to 1.0%

Si is an element that significantly decreases activities of Zn and Al in their melted state and has a significant influence on diffusion of Fe and the elements forming the metallic layer 3 in the hot stamping. Therefore, Si can significantly spoil a dispersed structure of the $FeAl_2$ phases 32b, and thus it is necessary to limit Si to an appropriate content. If a content of Si in the metallic layer 3 is excessively high, the $MgZn_2$ phases 32a in the metallic layer 3 is reduced, and $Mg_2Si$ phases are formed from the interface between the base metal and the metallic layer, significantly degrades corrosion resistance. Moreover, Zn that becomes unbound by the reduction in the $MgZn_2$ phases forms Zn phases, and thus the LME can occur. In addition, Si inhibits Fe from diffusing into the metallic layer 3, hampering growth of the interface layer 31 and growth of the $FeAl_2$ phases 32b. Therefore, the content of Si is preferably as low as possible and set at 1.0% or less. The content of Si is preferably set at 0.2% or less, more preferably 0%.

Balance: 12.0 to 45.0% of Zn and impurities

From a viewpoint of rust prevention, containing Zn of the metallic layer 3 is essential. Most of the Zn component contained in the metallic layer 3 is present in a form of the $MgZn_2$ phases 32a. On the other hand, Zn atoms can be replaced with Al atoms. Accordingly, although a small amount, Zn can be dissolved also in the $FeAl_2$ phases 32b. Therefore, in a case where an amount of the $MgZn_2$ phases 32a contained in the metallic layer is increased, a concentration of Zn in the metallic layer 3 is also increased.

Here, if a hot-stamped body 20 of which a metallic layer 3 has a high content of Zn and in which Zn is present in a form of the $MgZn_2$ phases 32a is subjected to a corrosion test, the $MgZn_2$ phases 32a are eluted, resulting in formation of white rust. In contrast, if a hot-stamped body of which a metallic layer 3 has a low content of Zn and containing substantially no intermetallic compounds not containing Fe, such as the $MgZn_2$ phases, is subjected to a corrosion test, intermetallic compounds containing Fe in the metallic layer corrodes to form red rust. In other words, whether white rust or red rust is formed as a result of corrosion has a close connection with the content of Zn in the metallic layer 3 and the presence of the $MgZn_2$ phases 32a in the principal layer 32.

Specifically, in a case where the content of Zn in the metallic layer 3 is 12.0% or more, white rust is formed from a coating X-cut in a corrosion test, but in a case where the content of Zn in the metallic layer 3 falls below 12.0%, red rust is formed immediately. For this reason, the content of Zn in the metallic layer 3 is set at 12.0% or more. On the other hand, if the content of Zn is excessively high, Zn phases not reacting with Mg precipitate in the metallic layer 3. The precipitation of the Zn phases causes a risk of the occurrence of the LME and, as a result, causes a risk of degrading a fatigue strength of the hot-stamped body. Accordingly, the content of Zn is set at 45.0% or less. A preferable lower limit of the content of Zn is 16.5%, and a more preferable lower limit of the content of Zn is 18.5%. A preferable upper limit of the content of Zn is 40.0%, and a more preferable upper limit of the content of Zn is 32.0%.

As seen from the above, the balance of the metallic layer 3 is made consist of 12.0 to 45.0% of Zn and impurities. As the impurities, any elements other than the elements described above may be contained in a range within which the any elements do not hinder advantageous effects of the present invention.

1-4. Oxide Layer 4

As an outermost layer of the hot-stamped body 20 according to the present embodiment, the oxide layer 4 can be formed due to oxidation of plating components. The oxide layer 4 can degrade a phosphoric chemical treatment property and an electrodeposition property that are given after the hot stamping, and thus the thinner the oxide layer 4 is, the better it is. As long as the oxide layer 4 has a thickness of 1.0 μm or less, the oxide layer 4 has no influence on principal performances of the metallic layer 3.

2. Plated Steel Sheet 10

Figure 1:
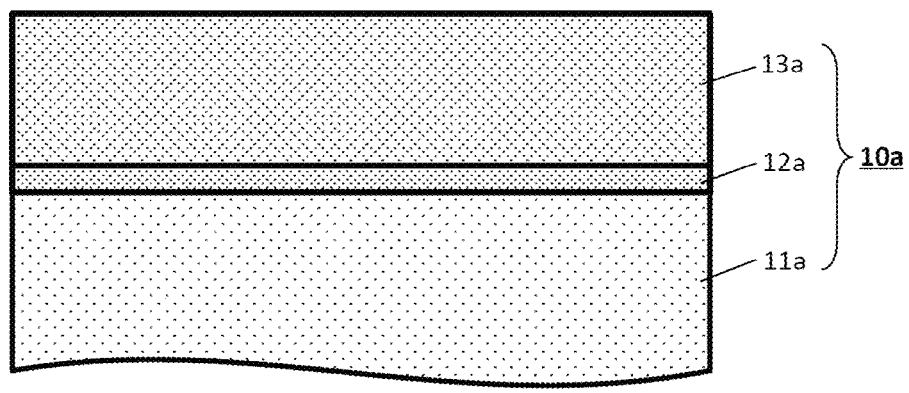
FIG. 1 is a schematic diagram illustrating a plated steel sheet produced by a normal plating process.
Figure 2:
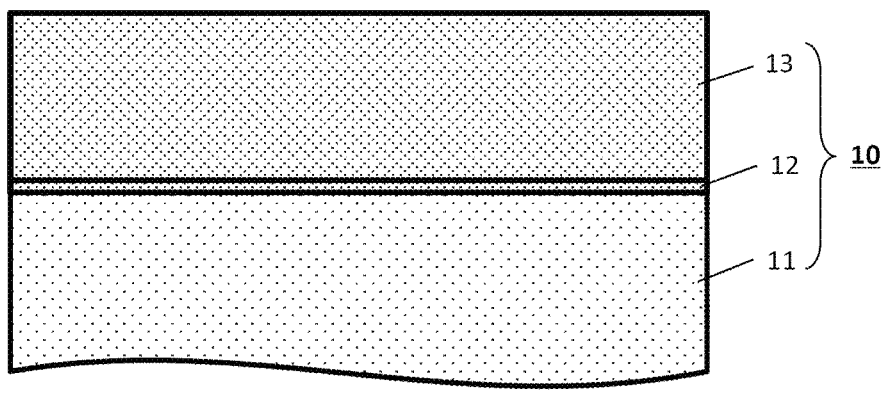
FIG. 2 is a schematic diagram illustrating a hot-stamped body formed of the plated steel sheet produced by the normal plating process.
Figure 3:
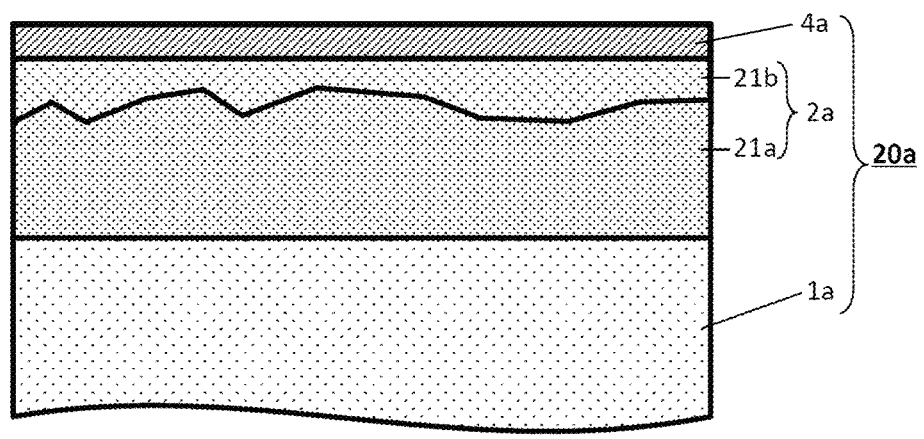
FIG. 3 is a schematic diagram illustrating a plated steel sheet produced under conditions found by the present inventors.

The plated steel sheet 10 used for obtaining the hot-stamped body 20 according to the present embodiment will be described. With reference to FIG. 3, the plated steel sheet 10 used for obtaining the hot-stamped body 20 according to the present embodiment includes the diffusion layer 12 between the base metal (base iron) 11 and the plating layer 13. A chemical composition of the base metal 11 is the same as a chemical composition of the base metal 1 of the hot-stamped body 20 according to the present embodiment and will not be described. The diffusion layer 12 is a thin layer that is mainly based on $Fe_2(Al, Zn)$. On the plating layer 13, there is no particular limitation, as long as the plating layer 13 is a Zn—Al—Mg-based plating layer and forms the metallic layer 3 having the chemical composition described above after the hot stamping. As the plating layer 13, for example, a plating layer having the following chemical composition can be used.

Zn: 17.0% or more

Zn is an element essential to form the $MgZn_2$ phases 32a in the principal layer 32 of the hot-stamped body 20 according to the present embodiment, and it is recommended that a content of Zn is set at 17.0% or more.

Al: 10.0 to 70.0%

Al is an element essential to form the insular $FeAl_2$ phases 32b in the principal layer 32 of the hot-stamped body 20 according to the present embodiment, and it is recommended that a content of Al is set within a range from 10.0 to 70.0%.

Mg: 7.0 to 20.0%

Mg is an element essential to form the $MgZn_2$ phases 32a in the principal layer 32 of the hot-stamped body 20 according to the present embodiment, and it is recommended that a content of Zn is set within a range from 7.0 to 20.0%. Mg within this range inhibits an excessive reaction between the base iron and mixtures of Zn, Al, or Zn and Al with Fe in its melted state.

Fe: 0.05 to 2.0%

In order to cause the insular $FeAl_2$ phases to precipitate during the heating in the hot stamping, it is recommended that a content of Fe is set at 0.05% or more. On the other hand, in order to inhibit an excessive alloying reaction in the hot stamping, the content of Fe is preferably 2.0% or less. Fe in the plating layer is derived not only from Fe contained in plating bath but also from the base metal.

Si: 0 to 1.0%

If a content of Si is excessively high, Si reacts with Mg to form the $Mg_2Si$ phases in the hot stamping, significantly degrading the corrosion resistance. Accordingly, the content of Si is preferably 1.0% or less.

The plating layer 13 may further contain the following elements. Contents of these elements remain substantially unchanged before and after the hot stamping. Ranges of the contents of these elements are the same as those in the description of the metallic layer 3 and will not be described.

Sb: 0 to 0.5%
Pb: 0 to 0.5%
Cu: 0 to 1.0%
Sn: 0 to 1.0%
Ti: 0 to 1.0%
Ca: 0 to 3.0%
Sr: 0 to 0.5%
Cr: 0 to 1.0%
Ni: 0 to 1.0%
Mn: 0 to 1.0%

In the plating layer 13, any elements other than the elements described above may be contained as impurities in a range within which the any elements do not hinder advantageous effects of the present invention.

A thickness of the plating layer 13 may be set at, for example, 3 to 50 μm. In addition, plating layers 13 may be provided on both surfaces of the steel sheet, or a plating layer 13 may be provided only on one of the surfaces of the steel sheet.

3. Method for Producing Hot-Stamped Body 20

Next, a method for producing the hot-stamped body 20 according to the present embodiment will be described. The method for producing the hot-stamped body according to the present embodiment includes a step of preparing a base metal (base metal preparing step), a step of forming Zn—Al—Mg plating layers on the base metal to prepare a plated steel sheet (plating treatment step), and a step of performing the hot stamping on the plated steel sheet (hot pressing step), and includes an anti-rust oil film forming step and a blanking step as necessary. The steps will be described below.

[Base Metal Preparing Step]

This step is a step of preparing a base metal. For example, a molten steel having the chemical composition described above is produced, and the produced molten steel is used to produce a slab by a casting process. Alternatively, the produced molten steel may be used to generate an ingot by an ingot-making process. The produced slab or ingot is subjected to hot rolling to be generated into the base metal (hot-rolled sheet). As necessary, the hot-rolled sheet may be subjected to pickling treatment then cold rolling, and the resultant cold-rolled sheet may be used as the base metal.

[Plating Treatment Step]

This step is a step of forming Zn—Al—Mg plating layers on the base metal. In this step, the Zn—Al—Mg plating layers having the composition described above are formed on both surfaces of the base metal. An amount of the plating layer adhered is preferably set at 170.0 g/m² or less per side. Note that, in this step, some kinds of pre-plating such as Ni pre-plating and Sn pre-plating can be performed as a supplement to plating adhesion, but the kinds of pre-plating bring about change in an alloying reaction, and thus an amount of the pre-plating adhered is preferably set at 2.0 g/m² or less per side.

However, in order not to cause the diffusion layer 12a, which is made of $Fe_2(Al, Zn)_5$ and the like, to grow on the plated steel sheet, it is recommended that the plating treatment is performed under conditions satisfying the followings.

If a temperature of plating bath is excessively high, the diffusion layer 12a made of $Fe_2(Al, Zn)_5$ and the like in the plated steel sheet grows to 1 μm or more, forming a thick interface layer in the hot-stamped body, which makes formation of a laminar metallic layer unavoidable. In addition, even when the temperature of the plating bath is lowered, the same problem arises if the time of immersion is excessively long. Therefore, it is preferable that the time of immersion is limited to 1 to 3 seconds, with a plating bath temperature lowered as much as possible, specifically to a melting temperature of plating +5 to 20° C. The diffusion layer 12 that grows between the base metal (base iron) 11 and the plating layer 13 under such conditions becomes a thin layer mainly based on $Fe_2(Al, Zn)$, with reference to FIG. 3. With such a diffusion layer 12, the plated steel sheet 10 does not cause the interface layer made of $Fe_2(Al, Zn)_5$ and the like to grow even when subjected to the hot stamping thereafter.

As described above, by lowering the temperature of the plating bath and shortening the time of immersion, growth of the diffusion layer 12 made of $Fe_2(Al, Zn)_5$ and the like, which results in a thick interface layer afterward, can be inhibited. However, if a preintroduction sheet temperature is lower than the temperature of the plating bath, there is a concern that the plating bath solidifies, which impairs cleanliness of the plating layer 13. On the other hand, if the introduction temperature is excessively high, there is a problem in that a cooling rate decreases, which causes the diffusion layer 12 made of $Fe_2(Al, Zn)_5$ and the like to grow thickly. With consideration given to these problems, the preintroduction sheet temperature is preferably set at the plating bath temperature +5 to 20° C.

[Hot Pressing Step]

This step is a step of performing the hot stamping on the plated steel sheet after being slowly heated. In this step, the plated steel sheet is heated mainly by resistance heating (Joule heating) or radiant heat.

In the hot stamping step, first, the plated steel sheet is inserted into a heating furnace and held at 900° C., which is a temperature equal to or higher than an $Ac_3$ point of the plated steel sheet. The plated steel sheet is then taken from the furnace, and immediately sandwiched with flat press mold provided with a water cooling jacket to press and cool the plated steel sheet at the same time. Note that a time from taking the heated plated steel sheet from the furnace until starting the cooling is about 5 seconds, and the cooling is started at a time when a temperature of the plated steel sheet becomes about 800° C. The cooling is performed in such a manner that, even in a portion of the plated steel sheet where its cooling rate is low, the cooling rate becomes 50° C./sec or more until a martensitic transformation starting point (410° C.) is reached.

For an elevated temperature process and a retention time of the hot stamping, there are optimum conditions. A heating rate in the elevated temperature process is preferably 10° C./sec or more, more preferably 30° C./sec or more. By setting the heating rate at the value or more, Fe can be inhibited from being supplied excessively from the base iron to the plating layer. For the same reason, a retention time for the holding at 900° C. is preferably 60 seconds or less, more preferably 30 seconds or less.

Through the hot stamping step, the hot-stamped body can be obtained from the plated steel sheet. In the hot stamping step, the plated steel sheet is exposed to the high temperature, but formation of scales can be inhibited because the plating layer inhibits oxidation of the base iron. Note that a shape of the hot-stamped body can be changed by replacing the cooling press mold with press mold of various shapes such as a rectangle and a circle.

The method for producing the hot-stamped body according to the present embodiment has been described above from the preparation of the base metal of the plated steel sheet, but the method is not limited to one described above. The hot-stamped body according to the present embodiment can be produced by, for example, performing hot stamping on a plated steel sheet that is obtained by purchase on a market or the like and includes a desired plating layer. Optionally selectable steps in this production method will be appended below.

[Anti-Rust Oil Film Forming Step]

This step is a step of forming anti-rust oil films by applying anti-rust oil to surfaces of the plated steel sheet to be hot-stamped, after the plating treatment step and before the hot stamping step. If a long time has elapsed from producing the plated steel sheet to be hot-stamped until performing the hot stamping, surfaces of the plated steel sheet may be oxidized. However, the surfaces of the plated steel sheet on which the anti-rust oil films are formed through this step resist being oxidized, which inhibits the formation of scales. As a method of forming the anti-rust oil films, a well-known technique can be used as appropriate.

[Blanking Step]

This step is a step of performing at least one of shearing and punching on the plated steel sheet to be hot-stamped to form the plated steel sheet into a specific shape, after the anti-rust oil film forming step and before the hot stamping step. A shear surface of the plated steel sheet after blanking is easily oxidized, but in a case where the anti-rust oil films are formed on the surfaces of the plated steel sheet in advance through the anti-rust oil film forming step, the oxidation of the plated steel sheet after the blanking can be inhibited because the anti-rust oil spreads over the shear surface of the plated steel sheet to some extent.

The hot-stamped body according to an embodiment of the present invention has been described above, but the embodiment is merely an example of the present invention. The present invention is therefore not limited to the embodiment, and the embodiment can be redesigned as appropriate without departing from the scope of the present invention.

4. Method for Analyzing Hot-Stamped Body 20

Next, a method for analyzing the metallic layer of the hot-stamped body according to the present embodiment will be described.

In the hot-stamped body 20 according to the present embodiment, thicknesses of the metallic layer 3, the interface layer 31, and the principal layer 32 can be determined by cutting a specimen out of the hot-stamped body 20, embedding the specimen in resin or the like, then polishing a cross section of the specimen, and performing length measurement on a SEM observation image. In addition, performing observation on a backscattered electron image under the SEM enables the layers to be identified and the thicknesses of the layers to be checked since different metallic components shows different contrasts in the observation. In a case where the interface between the interface layer 31 and the principal layer 32 is so unclear as to make it difficult to identify the thickness of the interface layer 31, the line analysis is performed and a position at which a concentration of Al is 30.0 to 36.0% is identified as the interface between the interface layer 31 and the principal layer 32. The same observation of a steel micro-structure is performed in three or more different visual fields, and averages of thicknesses observed in the visual fields are calculated and determined as the thicknesses of the metallic layer 3, the interface layer 31, and the principal layer 32.

In a case where a steel micro-structure of the metallic layer 3 has a spread, the thicknesses of the layers can be grasped accurately by using, for example, a mapping image obtained from an electron probe microanalyser (EPMA). Alternatively, the thicknesses of the layers can be determined by using a glow discharge spectrometer (GDS) to create a calibration curve used for quantitative analysis from an alloy of which components are ascertained in advance and by using the calibration curve to grasp an elemental intensity profile of layers in question in a depth direction. For example, by a GDS analysis with $\phi5$ mm, components may be grasped at a location where intensities of the components are substantially flat in the depth direction, and an average value of measurement results at five or more spots may be used to determine the thickness of the layers.

A chemical composition of the metallic layer 3 as a whole can be checked by dissolving the metallic layer 3 in an acid solution to which an inhibitor for inhibiting corrosion of the base iron is added, and performing measurement on a solution of the separated metallic layer 3 using the inductively coupled plasma (ICP) spectroscopy. In this case, what is measured is an average component value of the interface layer 31 and the principal layer 32 in total. An average composition of the plating layer before heated can be checked by dissolving the plating layer using fuming nitric acid and performing measurement on a solution of the separated plating layer using the ICP spectroscopy. A reason for using the fuming nitric acid is that using the fuming nitric acid enables Fe—Al-based intermetallic compounds to remain without being dissolved, enabling measurement of a concentration of Fe contained only on the plating layer.

In order to measure component values of the $MgZn_2$ phases 32a and the $FeAl_2$ phases 32b in the principal layer 32, it is preferable to perform quantitative analysis using SEM-EDX, EPMA observation, and the like. In this case, it is preferable that the quantitative analysis is performed at a plurality of locations where the principal layer 32 has similar steel micro-structures, and average values obtained from these locations as the component values. In determining components of each kinds of phase, it is preferable to use the average value obtained from at least ten or more locations.

Volume fractions of the $MgZn_2$ phases 32a and the $FeAl_2$ phases 32b in the principal layer 32 can be calculated by performing computational image processing on a SEM backscattered electron image of a given cross section of the principal layer 32. A $MgZn_2$ phase 32a and an $FeAl_2$ phase 32b are steel micro-structures of which contrasts are significantly different from each other on a backscattered electron image, and thus area fractions of the $MgZn_2$ phases 32a and the $FeAl_2$ phases 32b may be measured simply by binarization. Specifically, area fractions of the $MgZn_2$ phases 32a and the $FeAl_2$ phases 32b are measured from SEM backscattered electron images of at least five or more cross sections (five or more visual fields), and averages of the measured area fraction are defined as the volume fractions of the $MgZn_2$ phases 32a and the $FeAl_2$ phases 32b constituting the principal layer 32.

The corrosion resistance of the metallic layer 3 is evaluated most preferably using an exposure test, from which data can be obtained in line with an actual environment, but a high corrosion resistance plating takes a long time for the evaluation, and thus corrosion resistance evaluation may be conducted by an accelerated corrosion test. For example, the corrosion resistance can be evaluated by performing a salt spray test or a cyclic corrosion test and determining a condition of white rust formation or a condition of red rust formation. Hot-stamped bodies are often coated in use, and thus the hot-stamped body may be coated for automobile in advance, and a cut may be provided to a surface of the hot-stamped body as necessary.

The spot weldability can be evaluated by conducting a weldability lobe test on a plated steel sheet subjected to heat treatment equivalent to the hot stamping with a spot welder, to measure an appropriate current value, and then conducting a continuous dotting test. For example, the spot weldability can be evaluated by setting a starting nugget diameter is set at 6 mm, and measuring a number of dots at a time when the nugget diameter fall below $4\sqrt{t}$ (t is a steel sheet thickness).

Occurrence of LME can be checked by performed a bending test on a specimen after the hot stamping and observing a cracked portion from its metallic layer 3. Specifically, the occurrence of LME can be checked by subjecting the hot-stamped body immediately to a V-bending test or the like, embedding a specimen subjected to the V-bending test in resin or the like, polishing a surface of the specimen, and observing a cracked portion from its metallic layer 3. At the same time, by observing press mold used in the bending test, whether the plating layer is deposited in the hot stamping can be determined.

Whether the $FeAl_2$ phases are insular is determined through the following procedure.

(1) In the same manner as the above for the measurement of the area fractions of the $FeAl_2$ phases, $FeAl_2$ phases 32b of which entire contour lines can be recognized in the principal layer 32 are recognized from the SEM backscattered electron images. Here, circle equivalent diameters of $FeAl_2$ phases are calculated from areas of the $FeAl_2$ phases, and $FeAl_2$ phases having circle equivalent diameters of 100 nm or more are determined to be measured. $FeAl_2$ phases having circle equivalent diameters of less than 100 nm are ignored because such $FeAl_2$ phases have no practical influence in performances.

(2) Length 2d of projections of $FeAl_2$ phase 32b onto the interface between the metallic layer and the base metal, and contour lines (perimeters) L of the $FeAl_2$ phase are measured. In a case where a plurality of neighboring insular $FeAl_2$ phases agglomerate, 2d and L of each $FeAl_2$ phases forming the agglomerate are measured.

(3) Then, the measured 2d and L are substituted in the formula R=L/2d to be calculated as an R value.

(4) In the same manner as the above for the measurement of the area fractions of the $FeAl_2$ phases 32, R values of five or more $FeAl_2$ phases 32b are measured per cross section, 50 or more $FeAl_2$ phases 32b in total, from the SEM backscattered electron images of at least five or more cross sections (five visual fields). Then, an average of the measured R value is determined as an R value of the $FeAl_2$ phase 32 constituting the principal layer 32.

(5) $FeAl_2$ phases 32b having R=2.0 or more are determined to be insular. In contrast, $FeAl_2$ phases 32b having R less than 2.0 are determined to be laminar. In a case where the $FeAl_2$ phases 32b are less than 2.0, the $FeAl_2$ phases 32b are in a state substantially the same as that of a conventional hot-stamped body, and very few $FeAl_2$ phases 32b can be used in the measurement of the R value.

EXAMPLES

The present invention will be described below specifically with reference to Examples. Note that the present invention is not limited to the following Examples.

First, a base metal to be formed into a hot-stamped body was prepared. In other words, a molten steel having a chemical composition shown in Table 1 with the balance consisting of Fe and the impurities was subjected to a continuous casting process to be produced into a slab. Next, the slab was subjected to the hot rolling to be produced into a hot-rolled steel plate, and in addition, the heat-rolled steel plate was pickled and then subjected to the cold rolling to be produced into a cold-rolled steel sheet. The produced cold-rolled steel sheet was used as the base metal for plated steel sheets to be hot-stamped (its sheet thickness was 1.4 mm or 0.8 mm).

TABLE 1

PLATED STEEL SHEET
CHEMICAL COMPOSITION OF BASE METAL (mass %)

| C | Si | Mn | P | S | sol. Al | N | B | Ti | Cr |
|---|---|---|---|---|---|---|---|---|---|
| 0.2 | 0.2 | 1.3 | 0.01 | 0.005 | 0.02 | 0.002 | 0.002 | 0.02 | 0.2 |

BALANCE: Fe AND IMPURITIES

Next, from the produced base metal, plated steel sheets were produced under conditions shown in Table 4 and Table 5, using a batch hot dip coating system produced by RHESCA Co., LTD. and using plating baths containing components shown in Table 2 and Table 3. Note that Comparative Examples Nos. 45 and 46 are an Al-alloy plated steel sheet and a galvanized steel sheet, respectively, which are conventionally used as plated steel sheets to be hot-stamped. Specifically, the Comparative Example No. 45 is an Al-10% Si-alloy plated steel sheet, and the Comparative Example No. 46 is a Zn-11% Fe galvanized steel sheet.

The hot stamping was performed by setting a furnace temperature of a heating furnace at 900° C. being a temperature equal to or higher than an $Ac_3$ point of the steel sheets, placing each plated steel sheet into the heating furnace and heating the plated steel sheet at 900° C., and then pressing the plated steel sheet with press mold provided with a water cooling jacket. The hot stamping was performed in two modes with different conditions of heat treatment.

In a heat treatment A, a heating mode in the hot stamping was resistance heating, and both ends of each steel sheet were sandwiched with electrodes, and the steel sheet was increased in temperature from a room temperature to 900° C. at 50° C./sec, then retained for 30 seconds, next taken from the heating furnace, and immediately sandwiched and hot-stamped with flat press mold provided with a water cooling jacket, by which a hot-stamped body was produced. At this time, a concentration of oxygen in the heating furnace was kept to less than 18% by performing nitrogen flow.

In a heating process B, a heating mode in the hot stamping was radiant heat heating in an open-air furnace, each steel sheet was increased in temperature from the room temperature to 900° C. for 120 seconds at 5 to 10° C./sec, then retained for 60 seconds, and next taken from the heating furnace, immediately sandwiched and hot-stamped with flat press mold provided with a water cooling jacket, by which a hot-stamped body was produced.

A cooling condition is common to both the heat treatments A and B, quenching was controlled in such a manner that even in a portion of the plated steel sheet where its cooling rate is low, the cooling rate becomes 50° C./sec or more until about a martensitic transformation starting point (410° C.) is reached. In addition, a sample was cut out of the hot-stamped body as necessary.

TABLE 2

PLATED STEEL SHEET
CHEMICAL COMPOSITION OF PLATING LAYER (mass %)

| No. | CATEGORY | Zn | Al | Mg | Fe | Si | Sb | Pb | Cu | Sn | Ti | Ca | Sr | Cr | Ni | Mil |
|---|---|---|---|---|---|---|---|---|---|---|---|---|---|---|---|---|
| 1 | COMPARATIVE EXAMPLE | 84.9 | 9.0 | 6.0 | 0.1 | 0.0 | 0.0 | 0.0 | 0.0 | 0.0 | 0.0 | 0.0 | 0.0 | 0.0 | 0.0 | 0.0 |
| 2 | INVENTIVE EXAMPLE | 81.8 | 10.0 | 8.0 | 0.2 | 0.0 | 0.0 | 0.0 | 0.0 | 0.0 | 0.0 | 0.0 | 0.0 | 0.0 | 0.0 | 0.0 |
| 3 | INVENTIVE EXAMPLE | 75.7 | 17.0 | 7.0 | 0.3 | 0.0 | 0.0 | 0.0 | 0.0 | 0.0 | 0.0 | 0.0 | 0.0 | 0.0 | 0.0 | 0.0 |
| 4 | INVENTIVE EXAMPLE | 71.2 | 19.0 | 8.5 | 0.3 | 0.0 | 0.0 | 0.0 | 0.0 | 0.0 | 0.0 | 1.0 | 0.0 | 0.0 | 0.0 | 0.0 |
| 5 | INVENTIVE EXAMPLE | 71.3 | 19.0 | 8.5 | 0.2 | 0.0 | 0.0 | 0.0 | 0.0 | 0.0 | 0.0 | 1.0 | 0.0 | 0.0 | 0.0 | 0.0 |
| 6 | COMPARATIVE EXAMPLE | 71.5 | 19.0 | 8.5 | <0.05 | 0.0 | 0.0 | 0.0 | 0.0 | 0.0 | 0.0 | 1.0 | 0.0 | 0.0 | 0.0 | 0.0 |
| 7 | COMPARATIVE EXAMPLE | 71.4 | 19.0 | 8.5 | 0.3 | 0.0 | 0.0 | 0.0 | 0.0 | 0.0 | 0.0 | 1.0 | 0.0 | 0.0 | 0.0 | 0.0 |
| 8 | COMPARATIVE EXAMPLE | 71.3 | 19.0 | 7.5 | 0.2 | 0.0 | 0.0 | 0.0 | 0.0 | 2.0 | 0.0 | 0.0 | 0.0 | 0.0 | 0.0 | 0.0 |
| 9 | COMPARATIVE EXAMPLE | 71.2 | 19.5 | 8.0 | 0.3 | 0.0 | 0.0 | 1.0 | 0.0 | 0.0 | 0.0 | 0.0 | 0.0 | 0.0 | 0.0 | 0.0 |
| 10 | COMPARATIVE EXAMPLE | 70.9 | 18.0 | 7.5 | 0.1 | 0.0 | 0.0 | 0.0 | 0.0 | 0.0 | 0.0 | 3.5 | 0.0 | 0.0 | 0.0 | 0.0 |
| 11 | INVENTIVE EXAMPLE | 70.5 | 19.0 | 9.5 | 0.5 | 0.0 | 0.5 | 0.0 | 0.0 | 0.0 | 0.0 | 0.0 | 0.0 | 0.0 | 0.0 | 0.0 |
| 12 | INVENTIVE EXAMPLE | 70.6 | 18.0 | 10.5 | 0.4 | 0.0 | 0.0 | 0.5 | 0.0 | 0.0 | 0.0 | 0.0 | 0.0 | 0.0 | 0.0 | 0.0 |
| 13 | COMPARATIVE EXAMPLE | 69.7 | 19.3 | 10.0 | 0.3 | 0.0 | 0.7 | 0.0 | 0.0 | 0.0 | 0.0 | 0.0 | 0.0 | 0.0 | 0.0 | 0.0 |
| 14 | COMPARATIVE EXAMPLE | 67.8 | 10.0 | 21.0 | 0.2 | 0.0 | 0.0 | 0.0 | 0.0 | 0.0 | 0.0 | 1.0 | 0.0 | 0.0 | 0.0 | 0.0 |
| 15 | INVENTIVE EXAMPLE | 66.9 | 23.0 | 8.0 | 0.1 | 0.0 | 0.0 | 0.0 | 0.0 | 0.0 | 0.5 | 1.0 | 0.0 | 0.0 | 0.5 | 0.0 |
| 16 | INVENTIVE EXAMPLE | 67.9 | 23.0 | 8.0 | 0.1 | 0.0 | 0.0 | 0.2 | 0.0 | 0.8 | 0.0 | 0.0 | 0.0 | 0.0 | 0.0 | 0.0 |
| 17 | INVENTIVE EXAMPLE | 66.7 | 24.5 | 7.0 | 0.3 | 0.0 | 0.0 | 0.0 | 0.0 | 1.0 | 0.0 | 0.0 | 0.5 | 0.0 | 0.0 | 0.0 |
| 18 | INVENTIVE EXAMPLE | 63.4 | 25.0 | 10.0 | 0.3 | 0.0 | 0.0 | 0.0 | 0.5 | 0.5 | 0.0 | 0.0 | 0.3 | 0.0 | 0.0 | 0.0 |
| 19 | COMPARATIVE EXAMPLE | 63.7 | 25.0 | 10.0 | <0.05 | 0.0 | 0.0 | 0.0 | 0.5 | 0.5 | 0.0 | 0.0 | 0.3 | 0.0 | 0.0 | 0.0 |

TABLE 2-continued

| No. | CATEGORY | Zn | Al | Mg | Fe | Si | Sb | Pb | Cu | Sn | Ti | Ca | Sr | Cr | Ni | Mn |
|---|---|---|---|---|---|---|---|---|---|---|---|---|---|---|---|---|
| 20 | INVENTIVE EXAMPLE | 61.2 | 26.0 | 11.0 | 0.3 | 0.0 | 0.0 | 0.0 | 0.0 | 0.0 | 0.0 | 1.5 | 0.0 | 0.0 | 0.0 | 0.0 |
| 21 | INVENTIVE EXAMPLE | 61.2 | 26.0 | 11.0 | 0.3 | 0.0 | 0.0 | 0.0 | 0.0 | 0.0 | 0.0 | 1.5 | 0.0 | 0.0 | 0.0 | 0.0 |
| 22 | INVENTIVE EXAMPLE | 58.9 | 29.0 | 10.0 | 0.1 | 0.0 | 0.0 | 0.0 | 1.0 | 0.0 | 0.0 | 0.0 | 0.0 | 0.0 | 1.0 | 0.0 |
| 23 | COMPARATIVE EXAMPLE | 58.3 | 32.0 | 8.0 | 0.2 | 0.0 | 0.0 | 0.0 | 1.5 | 0.0 | 0.0 | 0.0 | 0.0 | 0.0 | 0.0 | 0.0 |
| 24 | COMPARATIVE EXAMPLE | 57.9 | 30.0 | 8.0 | 0.1 | 2.0 | 0.0 | 0.0 | 0.0 | 0.0 | 0.0 | 2.0 | 0.0 | 0.0 | 0.0 | 0.0 |
| 25 | COMPARATIVE EXAMPLE | 58.0 | 30.0 | 10.0 | 0.2 | 0.0 | 0.0 | 0.0 | 0.0 | 1.0 | 0.0 | 0.3 | 1.0 | 0.0 | 0.0 | 0.0 |

The underline indicates that the underlined value fell out of the range recommended in the present specification.

TABLE 3

| No. | CATEGORY | Zn | Al | Mg | Fe | Si | Sb | Pb | Cu | Sn | Ti | Ca | Sr | Cr | Ni | Mn |
|---|---|---|---|---|---|---|---|---|---|---|---|---|---|---|---|---|
| 26 | COMPARATIVE EXAMPLE | 54.8 | 38.0 | 6.0 | 0.2 | 0.0 | 0.0 | 0.0 | 0.0 | 0.0 | 0.0 | 0.5 | 0.5 | 0.0 | 0.0 | 0.0 |
| 27 | INVENTIVE EXAMPLE | 51.7 | 40.0 | 7.0 | 0.3 | 0.0 | 0.0 | 0.0 | 0.0 | 0.0 | 0.0 | 0.0 | 0.0 | 0.0 | 0.0 | 1.0 |
| 28 | COMPARATIVE EXAMPLE | 52.0 | 40.0 | 7.0 | <0.05 | 0.0 | 0.0 | 0.0 | 0.0 | 0.0 | 0.0 | 0.0 | 0.0 | 0.0 | 0.0 | 1.0 |
| 29 | COMPARATIVE EXAMPLE | 52.0 | 40.0 | 7.0 | <0.05 | 0.0 | 0.0 | 0.0 | 0.0 | 0.0 | 0.0 | 0.0 | 0.0 | 0.0 | 0.0 | 1.0 |
| 30 | COMPARATIVE EXAMPLE | 51.0 | 37.0 | 9.0 | 0.5 | 0.0 | 0.0 | 0.0 | 0.0 | 0.0 | 1.0 | 1.0 | 0.0 | 1.0 | 0.0 | 0.0 |
| 31 | INVENTIVE EXAMPLE | 50.0 | 36.5 | 10.0 | 0.5 | 0.0 | 0.0 | 0.0 | 0.0 | 0.0 | 1.0 | 1.0 | 0.0 | 1.0 | 0.0 | 0.0 |
| 32 | INVENTIVE EXAMPLE | 44.7 | 33.0 | 20.0 | 0.3 | 0.0 | 0.0 | 0.0 | 0.0 | 0.0 | 0.0 | 2.0 | 0.0 | 0.0 | 0.0 | 0.0 |
| 33 | INVENTIVE EXAMPLE | 44.7 | 33.0 | 20.0 | 0.3 | 0.0 | 0.0 | 0.0 | 0.0 | 0.0 | 0.0 | 2.0 | 0.0 | 0.0 | 0.0 | 0.0 |
| 34 | INVENTIVE EXAMPLE | 40.0 | 48.5 | 10.0 | 0.5 | 1.0 | 0.0 | 0.0 | 0.0 | 0.0 | 0.0 | 0.0 | 0.0 | 0.0 | 0.0 | 0.0 |
| 35 | INVENTIVE EXAMPLE | 35.0 | 52.5 | 10.0 | 0.5 | 0.0 | 0.0 | 0.0 | 0.0 | 0.0 | 0.0 | 2.0 | 0.0 | 0.0 | 0.0 | 0.0 |
| 36 | COMPARATIVE EXAMPLE | 35.0 | 52.5 | 10.0 | 0.5 | 0.0 | 0.0 | 0.0 | 0.0 | 0.0 | 0.0 | 2.0 | 0.0 | 0.0 | 0.0 | 0.0 |
| 37 | COMPARATIVE EXAMPLE | 33.0 | 54.0 | 9.0 | 2.0 | 0.0 | 0.0 | 0.0 | 0.0 | 0.0 | 0.0 | 0.0 | 0.0 | 0.0 | 2.0 | 0.0 |
| 38 | COMPARATIVE EXAMPLE | 36.0 | 54.0 | 9.0 | <0.05 | 0.0 | 0.0 | 0.0 | 0.0 | 0.0 | 0.0 | 0.0 | 0.0 | 0.0 | 0.0 | 1.0 |
| 39 | INVENTIVE EXAMPLE | 31.8 | 52.0 | 13.0 | 0.2 | 0.0 | 0.0 | 0.0 | 0.0 | 0.0 | 0.0 | 3.0 | 0.0 | 0.0 | 0.0 | 0.0 |
| 40 | INVENTIVE EXAMPLE | 30.0 | 58.5 | 10.0 | 0.5 | 0.0 | 0.0 | 0.0 | 0.0 | 0.0 | 0.0 | 1.0 | 0.0 | 0.0 | 0.0 | 0.0 |
| 41 | INVENTIVE EXAMPLE | 17.1 | 70.0 | 12.0 | 0.2 | 0.2 | 0.0 | 0.0 | 0.0 | 0.0 | 0.0 | 0.5 | 0.0 | 0.0 | 0.0 | 0.0 |
| 42 | COMPARATIVE EXAMPLE | 16.8 | 66.0 | 15.0 | 0.2 | 0.0 | 0.0 | 0.0 | 0.0 | 0.0 | 0.0 | 2.0 | 0.0 | 0.0 | 0.0 | 0.0 |
| 43 | COMPARATIVE EXAMPLE | 17.0 | 71.0 | 9.0 | 2.0 | 0.0 | 0.0 | 0.0 | 0.0 | 0.0 | 0.0 | 1.0 | 0.0 | 0.0 | 0.0 | 0.0 |
| 44 | COMPARATIVE EXAMPLE | 14.8 | 75.0 | 10.0 | 0.2 | 0.0 | 0.0 | 0.0 | 0.0 | 0.0 | 0.0 | 0.0 | 0.0 | 0.0 | 0.0 | 0.0 |
| 45 | COMPARATIVE EXAMPLE | 0.0 | 90.0 | 0.0 | <0.05 | 10.0 | 0.0 | 0.0 | 0.0 | 0.0 | 0.0 | 0.0 | 0.0 | 0.0 | 0.0 | 0.0 |
| 46 | COMPARATIVE EXAMPLE | 89.0 | 0.0 | 0.0 | 11.0 | 0.0 | 0.0 | 0.0 | 0.0 | 0.0 | 0.0 | 0.0 | 0.0 | 0.0 | 0.0 | 0.0 |

The underline indicates that the underlined value fell out of the range recommended in the present specification.

TABLE 4

| No. | CATEGORY | BATH TEMPERATURE (° C.) | TIME OF IMMERSION (sec) | PREINTRODUCTION SHEET TEMPERATURE (° C.) | PLATING THICKNESS (μm) | ADHERED PLATING AMOUNT PER SIDE (g/m2) | HS HEAT TREATMENT | FUSING POINT (° C.) |
|---|---|---|---|---|---|---|---|---|
| 1 | COMPARATIVE EXAMPLE | 435.0 | 1.0 | <u>435.0</u> | 10 | 60 | A | 420 |
| 2 | INVENTIVE EXAMPLE | 465.0 | 1.0 | 470.0 | 10 | 60 | A | 450 |
| 3 | INVENTIVE EXAMPLE | 475.0 | 1.0 | 480.0 | 20 | 100 | A | 470 |
| 4 | INVENTIVE EXAMPLE | 485.0 | 1.0 | 495.0 | 25 | 120 | A | 470 |
| 5 | INVENTIVE EXAMPLE | 475.0 | 2.0 | 480.0 | 25 | 120 | B | 470 |
| 6 | COMPARATIVE EXAMPLE | <u>585.0</u> | 2.0 | 590.0 | 25 | 120 | A | 485 |
| 7 | COMPARATIVE EXAMPLE | 500.0 | 2.0 | <u>485.0</u> | 25 | 120 | A | 485 |
| 8 | COMPARATIVE EXAMPLE | 485.0 | 2.0 | 490.0 | 15 | 80 | A | 470 |
| 9 | COMPARATIVE EXAMPLE | 485.0 | 2.0 | <u>485.0</u> | 15 | 80 | A | 470 |
| 10 | COMPARATIVE EXAMPLE | 495.0 | 1.0 | 500.0 | 20 | 100 | A | 475 |
| 11 | INVENTIVE EXAMPLE | 485.0 | 1.0 | 490.0 | 25 | 120 | A | 470 |
| 12 | INVENTIVE EXAMPLE | 485.0 | 1.0 | 500.0 | 15 | 75 | A | 470 |
| 13 | COMPARATIVE EXAMPLE | 485.0 | 1.0 | 490.0 | 20 | 90 | A | 470 |
| 14 | COMPARATIVE EXAMPLE | 555.0 | 2.0 | 570.0 | 30 | 100 | A | 540 |
| 15 | INVENTIVE EXAMPLE | 495.0 | 3.0 | 500.0 | 30 | 120 | A | 480 |
| 16 | INVENTIVE EXAMPLE | 495.0 | 1.0 | 500.0 | 30 | 120 | A | 480 |
| 17 | INVENTIVE EXAMPLE | 500.0 | 1.0 | 505.0 | 25 | 100 | A | 485 |
| 18 | INVENTIVE EXAMPLE | 495.0 | 1.0 | 500.0 | 40 | 130 | A | 480 |
| 19 | COMPARATIVE EXAMPLE | <u>565.0</u> | 1.0 | <u>565.0</u> | 40 | 130 | A | 515 |
| 20 | INVENTIVE EXAMPLE | 490.0 | 1.0 | 495.0 | 35 | 125 | A | 485 |
| 21 | INVENTIVE EXAMPLE | 500.0 | 1.0 | 505.0 | 35 | 125 | B | 485 |
| 22 | INVENTIVE EXAMPLE | 500.0 | 1.0 | 505.0 | 45 | 145 | A | 485 |
| 23 | COMPARATIVE EXAMPLE | 505.0 | 1.0 | <u>505.0</u> | 30 | 110 | A | 500 |
| 24 | COMPARATIVE EXAMPLE | 500.0 | 1.0 | <u>500.0</u> | 10 | 40 | A | 495 |
| 25 | COMPARATIVE EXAMPLE | 510.0 | 1.0 | 515.0 | <u>55</u> | 200 | A | 490 |

The underline indicates that the underlined value fell out of the range recommended in the present specification.

TABLE 5

| No. | CATEGORY | BATH TEMPERATURE (° C.) | TIME OF IMMERSION (sec) | PREINTRODUCTION SHEET TEMPERATURE (° C.) | PLATING THICKNESS (μm) | ADHERED PLATING AMOUNT PER SIDE (g/m2) | HS HEAT TREATMENT | FUSING POINT (° C.) |
|---|---|---|---|---|---|---|---|---|
| 26 | COMPARATIVE EXAMPLE | 540.0 | 1.0 | 545.0 | 25 | 80 | A | 525 |
| 27 | INVENTIVE EXAMPLE | 540.0 | 1.0 | 545.0 | 25 | 80 | A | 530 |
| 28 | COMPARATIVE EXAMPLE | <u>600.0</u> | <u>5.0</u> | 620.0 | 25 | 80 | A | 525 |
| 29 | COMPARATIVE EXAMPLE | 540.0 | <u>5.0</u> | 570.0 | 25 | 80 | A | 525 |
| 30 | COMPARATIVE EXAMPLE | 540.0 | <u>5.0</u> | 530.0 | 25 | 80 | A | 525 |

TABLE 5-continued

| No. | CATEGORY | BATH TEMPERATURE (° C.) | TIME OF IMMERSION (sec) | PREINTRODUCTION SHEET TEMPERATURE (° C.) | PLATING THICKNESS (μm) | ADHERED PLATING AMOUNT PER SIDE (g/m2) | HS HEAT TREATMENT | FUSING POINT (° C.) |
|---|---|---|---|---|---|---|---|---|
| 31 | INVENTIVE EXAMPLE | 545.0 | 1.0 | 550.0 | 25 | 80 | A | 530 |
| 32 | INVENTIVE EXAMPLE | 510.0 | 1.0 | 515.0 | 3 | 10 | A | 500 |
| 33 | INVENTIVE EXAMPLE | 515.0 | 1.0 | 520.0 | 3 | 10 | B | 500 |
| 34 | INVENTIVE EXAMPLE | 540.0 | 1.0 | 545.0 | 40 | 120 | A | 530 |
| 35 | INVENTIVE EXAMPLE | 545.0 | 1.0 | 550.0 | 25 | 80 | A | 530 |
| 36 | COMPARATIVE EXAMPLE | 545.0 | 2.0 | <u>545.0</u> | 25 | 80 | B | 530 |
| 37 | COMPARATIVE EXAMPLE | 545.0 | 3.0 | 550.0 | 25 | 80 | A | 540 |
| 38 | COMPARATIVE EXAMPLE | <u>605.0</u> | <u>5.0</u> | 610.0 | 25 | 80 | A | 530 |
| 39 | INVENTIVE EXAMPLE | 550.0 | 1.0 | 555.0 | 25 | 65 | A | 535 |
| 40 | INVENTIVE EXAMPLE | 575.0 | 1.0 | 580.0 | 25 | 65 | A | 560 |
| 41 | INVENTIVE EXAMPLE | 545.0 | 1.0 | 560.0 | 25 | 60 | A | 530 |
| 42 | COMPARATIVE EXAMPLE | 535.0 | 2.0 | <u>535.0</u> | 30 | 70 | A | 530 |
| 43 | COMPARATIVE EXAMPLE | 585.0 | 1.0 | 590.0 | 10 | 30 | A | 580 |
| 44 | COMPARATIVE EXAMPLE | 600.0 | 3.0 | 605.0 | 10 | 30 | A | 585 |
| 45 | COMPARATIVE EXAMPLE | 600.0 | 2.0 | 605.0 | 15 | 40 | B | 585 |
| 46 | COMPARATIVE EXAMPLE | 435.0 | 1.0 | 440.0 | 7 | 50 | B | 420 |

The underline indicates that the underlined value fell out of the range recommended in the present specification.

A cutlength sheet sample was cut out of each produced hot-stamped body, its plating was separated, and a chemical composition of a metallic layer of the hot-stamped body was measured. In addition, the cutlength sheet was embedded in resin and subjected to quantitative analysis by the SEM-EDX or the EPMA analysis, by which thicknesses of its interface layer and its principal layer were measured, and components of its $Al_2Fe$ phases and its $MgZn_2$ phases were determined by quantitative analysis. Results of the measurement and analysis are shown in Table 6 to Table 9.

TABLE 6

| | | HOT-STAMPED PRODUCT CHEMICAL COMPOSITION OF METALLIC LAYER (mass %) | | | | | | | | | | | | | | |
|---|---|---|---|---|---|---|---|---|---|---|---|---|---|---|---|---|
| No. | CATEGORY | Al | Fe | Mg | Sb | Pb | Cu | Sn | Ti | Ca | Sr | Cr | Ni | Mn | Si | Zn |
| 1 | COMPARATIVE EXAMPLE | 45.0 | <u>47.0</u> | <u>1.0</u> | 0.0 | 0.0 | 0.0 | 0.0 | 0.0 | 0.0 | 0.0 | 0.0 | 0.0 | 0.0 | 0.0 | <u>7.0</u> |
| 2 | INVENTIVE EXAMPLE | 34.0 | 45.0 | 2.5 | 0.0 | 0.0 | 0.0 | 0.0 | 0.0 | 0.0 | 0.0 | 0.0 | 0.0 | 0.0 | 0.0 | 18.5 |
| 3 | INVENTIVE EXAMPLE | 37.0 | 40.0 | 3.0 | 0.0 | 0.0 | 0.0 | 0.0 | 0.0 | 0.0 | 0.0 | 0.0 | 0.0 | 0.0 | 0.0 | 20.0 |
| 4 | INVENTIVE EXAMPLE | 37.0 | 39.0 | 3.0 | 0.0 | 0.0 | 0.0 | 0.0 | 0.0 | 0.5 | 0.0 | 0.0 | 0.0 | 0.0 | 0.0 | 20.5 |
| 5 | INVENTIVE EXAMPLE | 36.5 | 40.6 | 3.0 | 0.0 | 0.0 | 0.0 | 0.0 | 0.0 | 0.4 | 0.0 | 0.0 | 0.0 | 0.0 | 0.0 | 19.5 |
| 6 | COMPARATIVE EXAMPLE | 36.2 | 41.0 | 3.0 | 0.0 | 0.0 | 0.0 | 0.0 | 0.0 | 0.4 | 0.0 | 0.0 | 0.0 | 0.0 | 0.0 | 19.4 |
| 7 | COMPARATIVE EXAMPLE | 36.2 | 41.0 | 3.0 | 0.0 | 0.0 | 0.0 | 0.0 | 0.0 | 0.4 | 0.0 | 0.0 | 0.0 | 0.0 | 0.0 | 19.4 |
| 8 | COMPARATIVE EXAMPLE | 36.0 | 40.0 | 3.0 | 0.0 | 0.0 | 0.0 | <u>1.5</u> | 0.0 | 0.0 | 0.0 | 0.0 | 0.0 | 0.0 | 0.0 | 19.5 |
| 9 | COMPARATIVE EXAMPLE | 35.3 | 40.0 | 3.0 | 0.0 | <u>0.7</u> | 0.0 | 0.0 | 0.0 | 0.0 | 0.0 | 0.0 | 0.0 | 0.0 | 0.0 | 21.0 |
| 10 | COMPARATIVE EXAMPLE | 34.5 | 37.0 | 3.5 | 0.0 | 0.0 | 0.0 | 0.0 | 0.0 | <u>3.5</u> | 0.0 | 0.0 | 0.0 | 0.0 | 0.0 | 21.5 |
| 11 | INVENTIVE EXAMPLE | 37.0 | 40.5 | 3.0 | 0.5 | 0.0 | 0.0 | 0.0 | 0.0 | 0.0 | 0.0 | 0.0 | 0.0 | 0.0 | 0.0 | 19.0 |
| 12 | INVENTIVE EXAMPLE | 35.5 | 42.0 | 3.5 | 0.0 | 0.5 | 0.0 | 0.0 | 0.0 | 0.0 | 0.0 | 0.0 | 0.0 | 0.0 | 0.0 | 18.5 |

TABLE 6-continued

HOT-STAMPED PRODUCT
CHEMICAL COMPOSITION OF METALLIC LAYER (mass %)

| No. | CATEGORY | Al | Fe | Mg | Sb | Pb | Cu | Sn | Ti | Ca | Sr | Cr | Ni | Mn | Si | Zn |
|---|---|---|---|---|---|---|---|---|---|---|---|---|---|---|---|---|
| 13 | COMPARATIVE EXAMPLE | 34.0 | 38.3 | 5.0 | 0.7 | 0.0 | 0.0 | 0.0 | 0.0 | 0.0 | 0.0 | 0.0 | 0.0 | 0.0 | 0.0 | 22.0 |
| 14 | COMPARATIVE EXAMPLE | 9.0 | 9.0 | 11.5 | 0.0 | 0.0 | 0.0 | 0.0 | 0.0 | 0.0 | 0.0 | 0.0 | 0.0 | 0.0 | 0.0 | 70.5 |
| 15 | INVENTIVE EXAMPLE | 29.0 | 32.0 | 6.0 | 0.0 | 0.0 | 0.0 | 0.0 | 0.0 | 1.0 | 0.0 | 0.0 | 0.5 | 0.0 | 0.0 | 31.5 |
| 16 | INVENTIVE EXAMPLE | 29.0 | 33.0 | 6.0 | 0.0 | 0.0 | 0.0 | 0.5 | 0.0 | 0.0 | 0.0 | 0.0 | 0.0 | 0.0 | 0.0 | 31.5 |
| 17 | INVENTIVE EXAMPLE | 25.0 | 29.0 | 6.5 | 0.0 | 0.0 | 0.0 | 1.0 | 0.0 | 0.0 | 0.5 | 0.0 | 0.0 | 0.0 | 0.0 | 38.0 |
| 18 | INVENTIVE EXAMPLE | 23.0 | 24.7 | 9.0 | 0.0 | 0.0 | 0.5 | 0.5 | 0.0 | 0.0 | 0.3 | 0.0 | 0.0 | 0.0 | 0.0 | 42.0 |
| 19 | COMPARATIVE EXAMPLE | 23.7 | 25.0 | 8.0 | 0.0 | 0.0 | 0.5 | 0.5 | 0.0 | 0.0 | 0.3 | 0.0 | 0.0 | 0.0 | 0.0 | 42.0 |
| 20 | INVENTIVE EXAMPLE | 25.0 | 27.0 | 7.0 | 0.0 | 0.0 | 0.0 | 0.0 | 0.0 | 1.5 | 0.0 | 0.0 | 0.0 | 0.0 | 0.0 | 39.5 |
| 21 | INVENTIVE EXAMPLE | 26.5 | 27.5 | 6.5 | 0.0 | 0.0 | 0.0 | 0.0 | 0.0 | 1.5 | 0.0 | 0.0 | 0.0 | 0.0 | 0.0 | 38.0 |
| 22 | INVENTIVE EXAMPLE | 26.0 | 26.0 | 7.0 | 0.0 | 0.0 | 1.0 | 0.0 | 0.0 | 0.0 | 0.0 | 0.0 | 1.0 | 0.0 | 0.0 | 39.0 |
| 23 | COMPARATIVE EXAMPLE | 26.0 | 31.3 | 6.5 | 0.0 | 0.0 | 1.2 | 0.0 | 0.0 | 0.0 | 0.0 | 0.0 | 0.0 | 0.0 | 0.0 | 35.0 |
| 24 | COMPARATIVE EXAMPLE | 20.0 | 13.5 | 6.5 | 0.0 | 0.0 | 0.0 | 0.0 | 0.0 | 2.0 | 0.0 | 0.0 | 0.0 | 0.0 | 3.0 | 55.0 |
| 25 | COMPARATIVE EXAMPLE | 20.0 | 24.2 | 10.0 | 0.0 | 0.0 | 0.0 | 0.0 | 0.0 | 0.5 | 0.3 | 0.0 | 0.0 | 0.0 | 0.0 | 45.0 |

The underline indicates that the underlined value fell out of the range defined in the present invention.

TABLE 7

HOT-STAMPED PRODUCT
CHEMICAL COMPOSITION OF METALLIC LAYER (mass %)

| No. | CATEGORY | Al | Fe | Mg | Sb | Pb | Cu | Sn | Ti | Ca | Sr | Cr | Ni | Mn | Si | Zn |
|---|---|---|---|---|---|---|---|---|---|---|---|---|---|---|---|---|
| 26 | COMPARATIVE EXAMPLE | 30.0 | 21.0 | 1.5 | 0.0 | 0.0 | 0.0 | 0.0 | 0.0 | 0.5 | 1.0 | 0.0 | 0.0 | 0.0 | 0.0 | 46.0 |
| 27 | INVENTIVE EXAMPLE | 30.0 | 36.0 | 4.0 | 0.0 | 0.0 | 0.0 | 0.0 | 0.0 | 0.0 | 0.0 | 0.0 | 0.0 | 1.0 | 0.0 | 29.0 |
| 28 | COMPARATIVE EXAMPLE | 29.0 | 38.0 | 3.0 | 0.0 | 0.0 | 0.0 | 0.0 | 0.0 | 0.0 | 0.0 | 0.0 | 0.0 | 1.0 | 0.0 | 29.0 |
| 29 | COMPARATIVE EXAMPLE | 28.5 | 39.0 | 2.5 | 0.0 | 0.0 | 0.0 | 0.0 | 0.0 | 0.0 | 0.0 | 0.0 | 0.0 | 1.0 | 0.0 | 29.0 |
| 30 | COMPARATIVE EXAMPLE | 29.5 | 38.0 | 3.5 | 0.0 | 0.0 | 0.0 | 0.0 | 0.0 | 0.0 | 0.0 | 0.0 | 0.0 | 1.0 | 0.0 | 28.0 |
| 31 | INVENTIVE EXAMPLE | 30.5 | 32.5 | 5.0 | 0.0 | 0.0 | 0.0 | 0.0 | 1.0 | 0.5 | 0.0 | 1.0 | 0.0 | 0.0 | 0.0 | 29.5 |
| 32 | INVENTIVE EXAMPLE | 30.5 | 33.5 | 10.0 | 0.0 | 0.0 | 0.0 | 0.0 | 0.0 | 0.5 | 0.0 | 0.0 | 0.0 | 0.0 | 0.0 | 25.5 |
| 33 | INVENTIVE EXAMPLE | 32.0 | 35.0 | 6.0 | 0.0 | 0.0 | 0.0 | 0.0 | 0.0 | 0.5 | 0.0 | 0.0 | 0.0 | 0.0 | 0.0 | 26.5 |
| 34 | INVENTIVE EXAMPLE | 31.5 | 30.5 | 6.0 | 0.0 | 0.0 | 0.0 | 0.0 | 0.0 | 0.0 | 0.0 | 0.0 | 0.0 | 0.0 | 1.0 | 31.0 |
| 35 | INVENTIVE EXAMPLE | 32.0 | 36.5 | 5.0 | 0.0 | 0.0 | 0.0 | 0.0 | 0.0 | 1.0 | 0.0 | 0.0 | 0.0 | 0.0 | 0.0 | 25.5 |
| 36 | COMPARATIVE EXAMPLE | 33.0 | 36.8 | 4.7 | 0.0 | 0.0 | 0.0 | 0.0 | 0.0 | 1.0 | 0.0 | 0.0 | 0.0 | 0.0 | 0.0 | 24.5 |
| 37 | COMPARATIVE EXAMPLE | 31.0 | 30.0 | 6.0 | 0.0 | 0.0 | 0.0 | 0.0 | 0.0 | 0.0 | 0.0 | 0.0 | 2.0 | 0.0 | 0.0 | 31.0 |
| 38 | COMPARATIVE EXAMPLE | 30.0 | 31.0 | 6.0 | 0.0 | 0.0 | 0.0 | 0.0 | 0.0 | 0.0 | 0.0 | 0.0 | 2.0 | 0.0 | 0.0 | 31.0 |
| 39 | INVENTIVE EXAMPLE | 35.0 | 35.0 | 4.0 | 0.0 | 0.0 | 0.0 | 0.0 | 0.0 | 3.0 | 0.0 | 0.0 | 0.0 | 0.0 | 0.0 | 23.0 |
| 40 | INVENTIVE EXAMPLE | 38.0 | 36.5 | 4.0 | 0.0 | 0.0 | 0.0 | 0.0 | 0.0 | 0.0 | 0.0 | 0.0 | 0.0 | 0.0 | 0.0 | 21.5 |
| 41 | INVENTIVE EXAMPLE | 45.0 | 35.5 | 2.5 | 0.0 | 0.0 | 0.0 | 0.0 | 0.0 | 0.5 | 0.0 | 0.0 | 0.0 | 0.0 | 0.0 | 16.5 |
| 42 | COMPARATIVE EXAMPLE | 44.0 | 41.0 | 2.0 | 0.0 | 0.0 | 0.0 | 0.0 | 0.0 | 1.0 | 0.0 | 0.0 | 0.0 | 0.0 | 0.0 | 12.0 |
| 43 | COMPARATIVE EXAMPLE | 35.0 | 60.0 | 1.0 | 0.0 | 0.0 | 0.0 | 0.0 | 0.0 | 0.0 | 0.0 | 0.0 | 0.0 | 0.0 | 0.0 | 4.0 |

TABLE 7-continued

| | | HOT-STAMPED PRODUCT CHEMICAL COMPOSITION OF METALLIC LAYER (mass %) | | | | | | | | | | | | | | |
|---|---|---|---|---|---|---|---|---|---|---|---|---|---|---|---|---|
| No. | CATEGORY | Al | Fe | Mg | Sb | Pb | Cu | Sn | Ti | Ca | Sr | Cr | Ni | Mn | Si | Zn |
| 44 | COMPARATIVE EXAMPLE | <u>46.0</u> | 42.0 | <u>1.0</u> | 0.0 | 0.0 | 0.0 | 0.0 | 0.0 | 0.0 | 0.0 | 0.0 | 0.0 | 0.0 | 0.0 | <u>11.0</u> |
| 45 | COMPARATIVE EXAMPLE | 40.0 | <u>50.0</u> | <u>0.0</u> | 0.0 | 0.0 | 0.0 | 0.0 | 0.0 | 0.0 | 0.0 | 0.0 | 0.0 | 0.0 | <u>10.0</u> | 0.0 |
| 46 | COMPARATIVE EXAMPLE | <u>0.0</u> | <u>70.0</u> | <u>0.0</u> | 0.0 | 0.0 | 0.0 | 0.0 | 0.0 | 0.0 | 0.0 | 0.0 | 0.0 | 0.0 | 0.0 | 30.0 |

The underline indicates that the underlined value fell out of the range defined in the present invention.

TABLE 8

| | | HOT-STAMPED PRODUCT | | | | | |
|---|---|---|---|---|---|---|---|
| | | INTERFACE LAYER | | PRINCIPAL LAYER | | | |
| | | | | THICKNESS (μm) | FeAl2 PHASE (mass %) | | |
| No. | CATEGORY | THICKNESS (μm) | Al CONTENT (mass %) | | SHAPE | VOLUME FRACTION | Al |
| 1 | COMPARATIVE EXAMPLE | 0.1 | 33.0 | 6.0 | <u>LAMINAR</u> | 25.0 | 40.0 |
| 2 | INVENTIVE EXAMPLE | 0.1 | 34.0 | 3.0 | INSULAR | 75.0 | 40.0 |
| 3 | INVENTIVE EXAMPLE | 0.1 | 33.0 | 15.0 | INSULAR | 72.0 | 45.0 |
| 4 | INVENTIVE EXAMPLE | 0.5 | 30.0 | 20.0 | INSULAR | 72.0 | 46.0 |
| 5 | INVENTIVE EXAMPLE | 0.7 | 30.0 | 18.0 | INSULAR | 70.0 | 45.0 |
| 6 | COMPARATIVE EXAMPLE | 1.5 | 30.0 | 18.0 | <u>LAMINAR</u> | 25.0 | 40.0 |
| 7 | COMPARATIVE EXAMPLE | 1.5 | 30.0 | 16.0 | <u>LAMINAR</u> | 25.0 | <u>35.0</u> |
| 8 | COMPARATIVE EXAMPLE | 0.5 | 33.0 | 10.0 | INSULAR | 82.0 | 45.0 |
| 9 | COMPARATIVE EXAMPLE | 0.5 | 33.0 | 10.0 | INSULAR | 82.0 | 45.0 |
| 10 | COMPARATIVE EXAMPLE | 1.0 | 33.0 | 15.0 | INSULAR | 85.0 | 45.0 |
| 11 | INVENTIVE EXAMPLE | 1.0 | 33.0 | 20.0 | INSULAR | 80.0 | 47.0 |
| 12 | INVENTIVE EXAMPLE | 1.0 | 32.0 | 8.0 | INSULAR | 75.0 | 48.0 |
| 13 | COMPARATIVE EXAMPLE | 1.0 | 33.0 | 15.0 | INSULAR | 70.0 | 48.0 |
| 14 | COMPARATIVE EXAMPLE | 1.0 | 36.0 | 25.0 | <u>NOTHING</u> | | |
| 15 | INVENTIVE EXAMPLE | 3.0 | 33.0 | 25.0 | INSULAR | 55.0 | 48.0 |
| 16 | INVENTIVE EXAMPLE | 2.0 | 35.0 | 25.0 | INSULAR | 60.0 | 48.0 |
| 17 | INVENTIVE EXAMPLE | 1.0 | 31.0 | 20.0 | INSULAR | 55.0 | 45.0 |
| 18 | INVENTIVE EXAMPLE | 3.0 | 32.0 | 35.0 | INSULAR | 50.0 | 45.0 |
| 19 | COMPARATIVE EXAMPLE | 5.0 | 30.0 | 18.0 | <u>LAMINAR</u> | 25.0 | 40.0 |
| 20 | INVENTIVE EXAMPLE | 2.0 | 33.0 | 30.0 | INSULAR | 52.0 | 47.5 |
| 21 | INVENTIVE EXAMPLE | 2.0 | 33.0 | 28.0 | INSULAR | 55.0 | 47.0 |
| 22 | INVENTIVE EXAMPLE | 2.0 | 33.0 | 40.0 | INSULAR | 55.0 | 47.0 |
| 23 | COMPARATIVE EXAMPLE | 3.0 | 33.0 | 20.0 | INSULAR | 55.0 | 45.0 |

TABLE 8-continued

| | | | | | | | |
|---|---|---|---|---|---|---|---|
| 24 | COMPARATIVE EXAMPLE | 0.1 | 33.0 | 5.0 | NOTHING | | |
| 25 | COMPARATIVE EXAMPLE | 2.0 | 32.0 | <u>45.0</u> | INSULAR | 45.0 | 47.0 |

| | HOT-STAMPED PRODUCT PRINCIPAL LAYER | | | | | | | |
|---|---|---|---|---|---|---|---|---|
| | FeAl2 PHASE (mass %) | | | VOLUME | Zn PHASE (mass %) | | | |
| No. | Fe | Zn | OTHERS | FRACTION | Mg | Zn | Al | Fe | OTHERS |
| 1 | 47.0 | 13.0 | 0.0 | | NOTHING | | | | |
| 2 | 45.0 | 15.0 | 0.0 | 25.0 | 18.0 | 77.0 | 2.0 | 3.0 | 0.0 |
| 3 | 47.0 | 8.0 | 0.0 | 28.0 | 17.0 | 78.0 | 2.0 | 3.0 | 0.0 |
| 4 | 45.5 | 8.5 | 0.0 | 28.0 | 16.5 | 74.0 | 3.0 | 5.0 | 1.5 |
| 5 | 47.0 | 8.0 | 0.0 | 30.0 | 17.0 | 75.0 | 2.0 | 4.0 | 2.0 |
| 6 | 46.0 | 14.0 | 0.0 | | NOTHING | | | | |
| 7 | 51.0 | 14.0 | 0.0 | | NOTHING | | | | |
| 8 | 47.0 | 8.0 | 0.0 | 18.0 | 17.0 | <u>69.0</u> | 2.0 | 3.0 | 9.0 |
| 9 | 47.0 | 8.0 | 0.0 | 18.0 | 17.0 | <u>69.0</u> | 3.0 | 2.0 | 9.0 |
| 10 | 46.0 | 9.0 | 0.0 | 15.0 | <u>12.5</u> | 70.0 | 3.0 | 2.0 | 12.5 |
| 11 | 47.0 | 6.0 | 0.0 | 20.0 | 17.0 | 70.0 | 8.0 | 5.0 | 0.0 |
| 12 | 47.0 | 5.0 | 0.0 | 25.0 | 17.0 | 72.0 | 6.0 | 5.0 | 0.0 |
| 13 | 47.0 | 5.0 | 0.0 | 30.0 | 18.0 | <u>69.0</u> | 7.0 | 5.0 | 1.0 |
| 14 | | NOTHING | | 85.0 | 16.0 | 75.0 | 2.0 | <u>6.0</u> | 1.0 |
| 15 | 47.0 | 5.0 | 0.0 | 40.0 | 17.0 | 76.0 | 4.0 | 3.0 | 0.0 |
| 16 | 48.0 | 4.0 | 0.0 | 40.0 | 17.0 | 77.0 | 3.0 | 3.0 | 0.0 |
| 17 | 48.0 | 7.0 | 0.0 | 45.0 | 17.0 | 76.0 | 5.0 | 2.0 | 0.0 |
| 18 | 40.0 | 15.0 | 0.0 | 50.0 | 19.0 | 75.0 | 3.0 | 3.0 | 0.0 |
| 19 | 46.0 | 14.0 | 0.0 | | NOTHING | | | | |
| 20 | 44.0 | 8.5 | 0.0 | 48.0 | 15.5 | 75.0 | 2.5 | 3.5 | 3.5 |
| 21 | 45.0 | 7.0 | 1.0 | 45.0 | 16.0 | 77.0 | 4.0 | 3.0 | 0.0 |
| 22 | 45.0 | 7.0 | 1.0 | 45.0 | 16.0 | 78.0 | 3.0 | 3.0 | 0.0 |
| 23 | 47.0 | 7.5 | 0.5 | 45.0 | 17.0 | <u>69.0</u> | 2.0 | 3.0 | 9.0 |
| 24 | | NOTHING | | 50.0 | 17.0 | 70.0 | <u>9.0</u> | 3.0 | 1.0 |
| 25 | 45.0 | 8.0 | 0.0 | 55.0 | 15.0 | 79.0 | 3.0 | 3.0 | 0.0 |

The underline indicates that the underlined value fell out of the range defined in the present invention.

TABLE 9

| | | HOT-STAMPED PRODUCT | | | | | |
|---|---|---|---|---|---|---|---|
| | | INTERFACE LAYER | | PRINCIPAL LAYER | | | |
| | | | | | FeAl2 PHASE (mass %) | | |
| No. | CATEGORY | THICKNESS (μm) | Al CONTENT (mass %) | THICKNESS (μm) | SHAPE | VOLUME FRACTION | Al |
| 26 | COMPARATIVE EXAMPLE | <u>10.0</u> | 33.0 | 10.0 | INSULAR | 90.0 | 46.0 |
| 27 | INVENTIVE EXAMPLE | 5.0 | 33.0 | 15.0 | INSULAR | 60.0 | 47.0 |
| 28 | COMPARATIVE EXAMPLE | <u>9.0</u> | 30.0 | 18.0 | <u>LAMINAR</u> | 25.0 | 40.0 |
| 29 | COMPARATIVE EXAMPLE | <u>9.5</u> | 32.0 | 18.0 | <u>LAMINAR</u> | 20.0 | 40.0 |
| 30 | COMPARATIVE EXAMPLE | <u>9.5</u> | 31.0 | 20.0 | <u>LAMINAR</u> | 25.0 | 40.0 |
| 31 | INVENTIVE EXAMPLE | 2.0 | 33.0 | 16.0 | INSULAR | 62.0 | 51.0 |
| 32 | INVENTIVE EXAMPLE | 2.0 | 33.0 | 22.0 | INSULAR | 63.0 | 50.0 |
| 33 | INVENTIVE EXAMPLE | 2.0 | 33.0 | 20.0 | INSULAR | 65.0 | 49.0 |
| 34 | INVENTIVE EXAMPLE | 0.1 | 33.0 | 35.0 | INSULAR | 65.0 | 48.0 |
| 35 | INVENTIVE EXAMPLE | 2.0 | 33.0 | 17.0 | INSULAR | 67.0 | 48.0 |
| 36 | COMPARATIVE EXAMPLE | 2.0 | 33.0 | 17.0 | <u>LAMINAR</u> | 69.0 | 48.0 |
| 37 | COMPARATIVE EXAMPLE | 1.0 | 33.0 | 18.0 | INSULAR | 65.0 | 48.0 |

TABLE 9-continued

| | | | | | | | |
|---|---|---|---|---|---|---|---|
| 38 | COMPARATIVE EXAMPLE | 4.0 | 33.0 | 18.0 | LAMINAR | 25.0 | 40.0 |
| 39 | INVENTIVE EXAMPLE | 2.0 | 33.0 | 20.0 | INSULAR | 70.0 | 50.0 |
| 40 | INVENTIVE EXAMPLE | 1.0 | 33.0 | 19.0 | INSULAR | 75.0 | 51.0 |
| 41 | INVENTIVE EXAMPLE | 0.2 | 33.0 | 6.0 | INSULAR | 80.0 | 50.0 |
| 42 | COMPARATIVE EXAMPLE | 5.0 | 33.0 | 22.0 | LAMINAR | 85.0 | 55.0 |
| 43 | COMPARATIVE EXAMPLE | <u>6.0</u> | 33.0 | <u>2.0</u> | INSULAR | 90.0 | 50.0 |
| 44 | COMPARATIVE EXAMPLE | 5.0 | 35.0 | <u>2.0</u> | LAMINAR | 95.0 | 55.0 |
| 45 | COMPARATIVE EXAMPLE | MULTI-LAYERED STRUCTURE OF Al—Fe INTERMETALLIC COMPOUND | | | | | |
| 46 | COMPARATIVE EXAMPLE | LAYERED STRUCTURE OF Zn—Fe INTERMETALLIC COMPOUND | | | | | |

| | HOT-STAMPED PRODUCT PRINCIPAL LAYER | | | | | | | | |
|---|---|---|---|---|---|---|---|---|---|
| | FeAl2 PHASE (mass %) | | | | Zn PHASE (mass %) | | | | |
| No. | Fe | Zn | OTHERS | VOLUME FRACTION | Mg | Zn | Al | Fe | OTHERS |
| 26 | 45.0 | 9.0 | 0.0 | | NOTHING | | | | |
| 27 | 45.0 | 7.0 | 1.0 | 40.0 | 13.0 | 87.0 | 0.0 | 0.0 | 0.0 |
| 28 | 46.0 | 14.0 | 0.0 | | NOTHING | | | | |
| 29 | 46.0 | 14.0 | 0.0 | | NOTHING | | | | |
| 30 | 44.0 | <u>16.0</u> | 0.0 | | NOTHING | | | | |
| 31 | 45.0 | 4.0 | 0.0 | 38.0 | 15.0 | 80.5 | 1.0 | 3.0 | 0.5 |
| 32 | 50.0 | 0.0 | 0.0 | 37.0 | 20.0 | 77.0 | 1.0 | 2.0 | 0.0 |
| 33 | 49.0 | 2.0 | 0.0 | 35.0 | 18.0 | 77.0 | 2.0 | 3.0 | 0.0 |
| 34 | 48.0 | 4.0 | 0.0 | 35.0 | 17.0 | 81.0 | 0.0 | 1.0 | 1.0 |
| 35 | 47.0 | 5.0 | 0.0 | 33.0 | 16.5 | 79.0 | 0.0 | 3.5 | 1.0 |
| 36 | 48.0 | 4.0 | 0.0 | | NOTHING | | | | |
| 37 | <u>39.0</u> | 4.0 | 9.0 | 35.0 | 17.0 | 80.0 | 0.0 | 2.0 | 1.0 |
| 38 | 46.0 | 14.0 | 0.0 | | NOTHING | | | | |
| 39 | 45.0 | 5.0 | 0.0 | 30.0 | 15.0 | 80.0 | 0.0 | 3.0 | 2.0 |
| 40 | 45.0 | 4.0 | 0.0 | 25.0 | 17.0 | 79.0 | 0.0 | 4.0 | 0.0 |
| 41 | 48.0 | 2.0 | 0.0 | 20.0 | 16.0 | 80.0 | 0.0 | 3.0 | 1.0 |
| 42 | 43.0 | 2.0 | 0.0 | | NOTHING | | | | |
| 43 | 45.0 | 5.0 | 0.0 | 10.0 | 17.0 | 79.0 | 0.0 | 4.0 | 0.0 |
| 44 | 40.0 | 5.0 | 0.0 | | NOTHING | | | | |
| 45 | MULTI-LAYERED STRUCTURE OF Al—Fe INTERMETALLIC COMPOUND | | | | | | | | |
| 46 | LAYERED STRUCTURE OF Zn—Fe INTERMETALLIC COMPOUND | | | | | | | | |

The underline indicates that the underlined value fell out of the range defined in the present invention.

Performances of each hot-stamped body are shown in Table 10 and Table 11. Methods of testing the performances are as follows.

[Hot V-Bending Test]

In order to check the LME property, each plated steel sheet before the hot stamping (50 mm×50 mm×1.4 mm) was placed into a heating furnace and heated to 900° C. A furnace temperature of the heating furnace was set at 900° C. being a temperature equal to or higher than the $Ac_3$ point of the steel sheet.

Next, the steel sheet was taken from the heating furnace and immediately subjected to a hot V-bending using a large press machine. Note that a time from taking the steel sheet from the heating furnace until starting the bending of the steel sheet was set at 5 seconds. After the bending, the steel sheet was quenched to about the martensitic transformation starting point (410° C.) at a cooling rate of 50° C./sec or more. The press mold had such a shape that an outer portion of the steel sheet at a bending radius of the V-bending is expanded by about 15% at an end of the bending.

Whether the liquid metal embrittlement cracking (LME) occurred was checked by observing a cross section of the steel sheet in its thickness direction at its V-bending region using a SEM and a backscattered electron detector, and checking a backscattered electron image.

The cross section at the V-bending region was observed and evaluated as follows. A case with no crack or with a crack of which an end stopped within its principal layer was rated as "AAA" (best). A case with a crack of which an end stopped within its interface layer was rated as "A" (good). A case with a crack that reached its base metal was rated as "B" (poor). Cases rated as an evaluation "A" or better were determined as passed. Results of this evaluation are also shown in Table 10 and Table 11.

At the same time, the same V-bending test was repeated 100 times. After each repetition of the test, adhesion (deposition) of plating to the press mold used in the hot V-bending test was checked, and a case where even a trace of deposition was confirmed on the press mold was determined as deposited. A case where an incidence of the deposition was 0% was rated as "AAA" (best), a case where the incidence of the deposition was 0 to 5% was rated as "A" (good), and a case where the incidence of the deposition was 5% or more was rated as "B" (poor). Cases rated as an evaluation "A" or better were determined as passed. Results of this evaluation are also shown in Table 10 and Table 11.

[Corrosion Test]

Next, each hot-stamped body (plate-shaped, 100×50 mm) was subjected to surface conditioning at the room temperature for 20 seconds using a surface conditioner produced by NIHON PERKERIZING Co., LTD (trade name: PREPALENE-X). Subsequently, the surface-conditioned hot-stamped body was subjected to phosphate treatment using a zinc phosphate treatment liquid produced by NIHON PERKERIZING Co., LTD (trade name: PALBOND 3020). Specifically, the hot-stamped body was immersed in the treatment liquid for 120 seconds with a temperature of the treatment liquid set at 43° C. A phosphate coating was thereby formed on a surface of the steel sheet of the hot-stamped body.

After performing the phosphate treatment, a plate-shaped hot-stamped body of each test number was subjected to electrodeposition with a cationic electrodeposition paint produced by NIPPONPAINT Co., Ltd. by slope energization at a voltage of 160 V and additionally subjected to baking coating at a baking temperature of 170° C. for 20 minutes. After the electrodeposition, every sample has an average coating thickness of the paint of 15 μm.

Evaluation of an anti-red-rust property was conducted by conducting the cyclic corrosion test (JASO M609-91) on each electrodeposited hot-stamped body given an X-cut that reached its steel material. As a specific method for the evaluation, a time taken for formation of red rust was evaluated. A case where red rust was formed at 30 cycles of the cyclic corrosion test was rated as "B" (poor), a case where red rust was formed at 60 cycles was rated as "A" (acceptable), a case where red rust was formed at 90 cycles was rated as "AA" (good), and a case where red rust was not formed even at 150 cycles or more was rated as "AAA" (best). Cases rated as an evaluation "A" or better were determined as passed. Results of this evaluation are also shown in Table 10 and Table 11.

In addition, at 120 cycles of the cyclic corrosion test, a maximum coating swelling width from the cut was calculated in a form of an average from eight spots around the X-cut, by which a coating swelling property was evaluated. A case where the coating swelling width at 120 cycles was 3 mm or more was rated as "B" (poor), a case where the coating swelling width was 2 mm to 3 mm was rated as "A" (good), and a case where the coating swelling width was less than 2 mm was rated as "AAA" (best). Cases rated as an evaluation "A" or better were determined as passed. Results of this evaluation are also shown in Table 10 and Table 11.

In addition, at 120 cycles of the cyclic corrosion test, running rust (rust running width) from an end of the running rust at a coating swelling portion to an end of rust adhesion portion was calculated in a form of an average from eight spots around the X-cut, by which the running rust width was measured. A case where running rust width at 120 cycles was 5 mm or more was rated as "B" (poor), a case where the running rust width was 3 mm to 5 mm was rated as "A" (good), and a case where the running rust width was less than 3 mm was rated as "AAA" (best). Cases rated as an evaluation "A" or better were determined as passed. Results of this evaluation are also shown in Table 10 and Table 11.

[Spot Welding]

Next, in order to check an continuous spotting property of a hot-stamped body, a sample of the hot-stamped body of which the principal layer has a thickness of 25 μm (0.8 mm plate) was prepared.

Welding conditions included a pressing force of 1860 N, a squeeze time of 30 cycles, an upslope of 3 cycles, a weld time of 7 cycles, a hold time of 25 cycles, electrodes used: OBARA DHOM type, and preliminary spot welding points of 20 dots. A nugget diameter was measured by peeling, and a button diameter was evaluated as the nugget diameter. In a case where the nugget is not round, an average of its major axis and its minor axis was used as the nugget diameter. As a current value of continuous dotting, a weldability lobe test was conducted in advance under the same welding conditions, and a current value that makes a nugget diameter 6 mm was employed. Under the above conditions, continuous dotting was performed until dots showed an average nugget diameter of 3.8 mm or less.

A case where a number of continuous spotting welding point was less than 100 was rated as "B" (poor), a case where the number of continuous spotting welding point ranged from 100 to 200 was rated as "A" (acceptable), a case where the number of continuous spotting welding point ranged from 200 to 1000 or more was rated as "AA" (good), and a case where the number of continuous spotting welding point was 1000 or more was rated as "AAA" (best). Cases rated as an evaluation "A" or better were determined as passed. Results of this evaluation are also shown in Table 10 and Table 11.

TABLE 10

| No. | CATEGORY | HOT V-BENDING DEPOSITION | LME | CORROSION TEST RED RUST | COATING SWELLING | RUNNING RUST WIDTH | SPOT WELDING ELECTRODE LIFE |
|---|---|---|---|---|---|---|---|
| 1 | COMPARATIVE EXAMPLE | B | B | B | B | B | B |
| 2 | INVENTIVE EXAMPLE | AAA | AAA | A | A | A | AAA |
| 3 | INVENTIVE EXAMPLE | AAA | AAA | A | A | A | AAA |
| 4 | INVENTIVE EXAMPLE | AAA | AAA | A | A | AAA | AAA |
| 5 | INVENTIVE EXAMPLE | AAA | AAA | A | A | AAA | AAA |
| 6 | COMPARATIVE EXAMPLE | B | B | B | B | B | B |
| 7 | COMPARATIVE EXAMPLE | B | B | B | B | B | B |
| 8 | COMPARATIVE EXAMPLE | B | B | B | B | AAA | AAA |

TABLE 10-continued

| No. | CATEGORY | HOT V-BENDING DEPOSITION | LME | CORROSION TEST RED RUST | COATING SWELLING | RUNNING RUST WIDTH | SPOT WELDING ELECTRODE LIFE |
|---|---|---|---|---|---|---|---|
| 9 | COMPARATIVE EXAMPLE | B | B | B | B | B | AAA |
| 10 | COMPARATIVE EXAMPLE | AAA | AAA | AA | B | B | AAA |
| 11 | INVENTIVE EXAMPLE | AAA | AAA | AA | AA | AAA | AAA |
| 12 | INVENTIVE EXAMPLE | AAA | AAA | AAA | AAA | AAA | AAA |
| 13 | COMPARATIVE EXAMPLE | AAA | AAA | B | B | AAA | AAA |
| 14 | COMPARATIVE EXAMPLE | B | B | B | B | B | B |
| 15 | INVENTIVE EXAMPLE | AAA | AAA | AAA | AAA | AAA | AAA |
| 16 | INVENTIVE EXAMPLE | AAA | AAA | AAA | AAA | AAA | AAA |
| 17 | INVENTIVE EXAMPLE | A | AAA | AAA | AAA | AAA | AA |
| 18 | INVENTIVE EXAMPLE | A | AAA | AAA | AAA | A | AA |
| 19 | COMPARATIVE EXAMPLE | B | B | B | B | B | B |
| 20 | INVENTIVE EXAMPLE | A | AAA | AAA | AAA | AAA | A |
| 21 | INVENTIVE EXAMPLE | A | AAA | AAA | AAA | AAA | A |
| 22 | INVENTIVE EXAMPLE | A | AAA | AAA | AAA | AAA | AA |
| 23 | COMPARATIVE EXAMPLE | A | AAA | B | B | A | AA |
| 24 | COMPARATIVE EXAMPLE | B | B | B | B | A | B |
| 25 | COMPARATIVE EXAMPLE | B | B | AAA | AAA | AAA | B |

TABLE 11

| No. | CATEGORY | HOT V-BENDING DEPOSITION | LME | CORROSION TEST RED RUST | COATING SWELLING | RUNNING RUST WIDTH | SPOT WELDING ELECTRODE LIFE |
|---|---|---|---|---|---|---|---|
| 26 | COMPARATIVE EXAMPLE | AAA | B | B | B | B | AAA |
| 27 | INVENTIVE EXAMPLE | AAA | AAA | AAA | AAA | A | AAA |
| 28 | COMPARATIVE EXAMPLE | B | B | B | B | A | B |
| 29 | COMPARATIVE EXAMPLE | B | B | B | B | A | B |
| 30 | COMPARATIVE EXAMPLE | B | B | B | B | A | B |
| 31 | INVENTIVE EXAMPLE | AAA | AAA | AAA | AAA | AAA | AAA |
| 32 | INVENTIVE EXAMPLE | AAA | AAA | AAA | AAA | AAA | AAA |
| 33 | INVENTIVE EXAMPLE | AAA | AAA | AAA | AAA | AAA | AAA |
| 34 | INVENTIVE EXAMPLE | AAA | AAA | AAA | AAA | A | AAA |
| 35 | INVENTIVE EXAMPLE | A | AAA | AAA | AAA | AAA | AAA |
| 36 | COMPARATIVE EXAMPLE | B | B | B | B | B | B |
| 37 | COMPARATIVE EXAMPLE | AAA | AAA | B | B | B | AAA |
| 38 | COMPARATIVE EXAMPLE | B | B | B | B | B | AAA |

TABLE 11-continued

|     |             |              |     | CORROSION TEST |          |         | SPOT WELDING |
|-----|-------------|--------------|-----|----------------|----------|---------|--------------|
|     |             | HOT V-BENDING |    | RED            | COATING  | RUNNING | ELECTRODE    |
| No. | CATEGORY    | DEPOSITION   | LME | RUST           | SWELLING | RUST WIDTH | LIFE      |
| 39  | INVENTIVE EXAMPLE  | AAA | AAA | AAA | AAA | AAA | AAA |
| 40  | INVENTIVE EXAMPLE  | AAA | AAA | AAA | AAA | AAA | AAA |
| 41  | INVENTIVE EXAMPLE  | AAA | AAA | AA  | AA  | A   | AAA |
| 42  | COMPARATIVE EXAMPLE | B   | B   | B   | B   | B   | B   |
| 43  | COMPARATIVE EXAMPLE | AAA | AAA | B   | B   | B   | AAA |
| 44  | COMPARATIVE EXAMPLE | AAA | B   | B   | B   | A   | AAA |
| 45  | COMPARATIVE EXAMPLE | AAA | AAA | B   | B   | B   | AAA |
| 46  | COMPARATIVE EXAMPLE | AAA | A   | B   | B   | B   | AAA |

Refer to Table 2 to Table 11, it is understood that hot-stamped bodies of inventive examples were excellent in the fatigue properties, the spot weldability, and the corrosion resistance.

In contrast, some of hot-stamped bodies of Comparative Examples included the evaluation of "B" (poor) in the fatigue properties, the spot weldability, and the corrosion resistance, and consequently, such hot-stamped bodies did not satisfy one or more of the fatigue properties, the spot weldability, and the corrosion resistance.

REFERENCE SIGNS LIST 10 plated steel sheet
11 base metal
12a diffusion layer
13a plating layer
20 hot-stamped body according to the present embodiment
1 steel base metal (base metal)
3 metallic layer
31 interface layer
32 principal layer
32a $MgZn_2$ phase
32b $FeAl_2$ phase
4 oxide layer
10a plated steel sheet produced under normal conditions
11a base metal
12a diffusion layer
13a plating layer
20a normal hot-stamped body
1a base metal
2a near-surface portion
21a interface layer
21b metallic layer
4a oxide layer

The invention claimed is:
1. A hot-stamped body comprising:
a steel base metal; and
a metallic layer formed on a surface of the steel base metal, wherein
the metallic layer includes an interface layer and a principal layer,
the interface layer contains, in mass%, Al: 30.0 to 36.0%, has a thickness of 100 nm to 5 μm, and is located in an interface between the metallic layer and the steel base metal,
the principal layer includes coexisting $MgZn_2$ phases and insular $FeAl_2$ phases, has a thickness of 3 μm to 40 μm, and is located on the interface layer, wherein an insular $FeAl_2$ phase is defined as an $FeAl_2$ phase having a ratio perimeter R of 2 or more, wherein R is defined as:

$$R = L/2d \geq 2$$

wherein 2d denotes a length of a projection of an $FeAl_2$ phase onto the interface between the metallic layer and the steel base metal, and L denotes a perimeter of the $FeAl_2$ phase;
an average composition of the metallic layer consists of, in mass%:
Al: 20.0 to 45.0%;
Fe: 10.0 to 45.0%;
Mg: 2.0 to 10.0%;
Sb: 0 to 0.5%;
Pb: 0 to 0.5%;
Cu: 0 to 1.0%;
Sn: 0 to 1.0%;
Ti: 0 to 1.0%;
Ca: 0 to 3.0%;
Sr: 0 to 0.5%;
Cr: 0 to 1.0%;
Ni: 0 to 1.0%;
Mn: 0 to 1.0%;
Si: 0 to 1.0%; and
12.0 to 45.0% of a combination of Zn and impurities,
in the principal layer, the $MgZn_2$ phases each contain, in mass%:
Mg: 13.0 to 20.0%;
Zn: 70.0 to 87.0%;
Al: 0 to 8.0%; and
Fe: 0 to 5.0%, and
in the principal layer, the $FeAl_2$ phases each contain, in mass%:
Al: 40.0 to 55.0%;
Fe: 40.0 to 55.0%; and
Zn: 0 to 15.0%.
2. The hot-stamped body according to claim 1, wherein in the principal layer,
a volume fraction of the $FeAl_2$ phases is 50.0 to 80.0%, and
a volume fraction of the $MgZn_2$ phases is 20.0 to 50.0%.

3. The hot-stamped body according to claim 2, wherein in the principal layer,
a volume fraction of the FeAl$_2$ phases is 60.0 to 75.0%, and
a volume fraction of the MgZn$_2$ phases is 25.0 to 45.0%.

4. The hot-stamped body according to claim 1, wherein in the principal layer,
a volume fraction of the FeAl$_2$ phases is 60.0 to 75.0%, and
a volume fraction of the MgZn$_2$ phases is 25.0 to 45.0%.

5. A hot-stamped body comprising:
a steel base metal; and
a metallic layer formed on a surface of the steel base metal, wherein
the metallic layer includes an interface layer and a principal layer,
the interface layer contains, in mass%, Al: 30.0 to 36.0%, has a thickness of 100 nm to 5 μm, and is located in an interface between the metallic layer and the steel base metal,
the principal layer includes coexisting MgZn$_2$ phases and insular FeAl$_2$ phases, has a thickness of 3 μm to 40 μm, and is located on the interface layer, wherein an insular FeAl$_2$ phase is defined as an FeAl$_2$ phase having a ratio perimeter R of 2 or more, wherein R is defined as:

$$R=L/2d\geq 2$$

wherein 2d denotes a length of a projection of an FeAl$_2$ phase onto the interface between the metallic layer and the steel base metal, and L denotes a perimeter of the FeAl$_2$ phase;

an average composition of the metallic layer comprises, in mass%:
Al: 20.0 to 45.0%;
Fe: 10.0 to 45.0%;
Mg: 2.0 to 10.0%;
Sb: 0 to 0.5%;
Pb: 0 to 0.5%;
Cu: 0 to 1.0%;
Sn: 0 to 1.0%;
Ti: 0 to 1.0%;
Ca: 0 to 3.0%;
Sr: 0 to 0.5%;
Cr: 0 to 1.0%;
Ni: 0 to 1.0%;
Mn: 0 to 1.0%;
Si: 0 to 1.0%; and
12.0 to 45.0% of a combination of Zn and impurities,
in the principal layer, the MgZn$_2$ phases each contain, in mass%:
Mg: 13.0 to 20.0%;
Zn: 70.0 to 87.0%;
Al: 0 to 8.0%; and
Fe: 0 to 5.0%, and
in the principal layer, the FeAl$_2$ phases each contain, in mass%:
Al: 40.0 to 55.0%;
Fe: 40.0 to 55.0%; and
Zn: 0 to 15.0%.

\* \* \* \* \*